「(12) United States Patent
Castañeda Garcia et al.

(10) Patent No.: US 11,121,759 B2
(45) Date of Patent: Sep. 14, 2021

(54) TECHNIQUES FOR INTERFERENCE-AWARE BEAM PAIR SELECTION

(71) Applicant: Huawei Technologies Co., Ltd., Shenzhen (CN)

(72) Inventors: Mario Hernán Castañeda Garcia, Munich (DE); Jian Luo, Munich (DE); Richard Stirling-Gallacher, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/859,796

(22) Filed: Apr. 27, 2020

(65) Prior Publication Data
US 2020/0259547 A1 Aug. 13, 2020

Related U.S. Application Data

(63) Continuation of application No. PCT/EP2017/077671, filed on Oct. 27, 2017.

(51) Int. Cl.
*H04B 7/06* (2006.01)
*H04B 7/08* (2006.01)
*H04L 5/00* (2006.01)

(52) U.S. Cl.
CPC ........... *H04B 7/0695* (2013.01); *H04B 7/088* (2013.01); *H04L 5/0048* (2013.01)

(58) Field of Classification Search
CPC .... H04B 7/0695; H04B 7/0408; H04B 7/088; H04B 7/0617; H04W 72/046;
(Continued)

(56) References Cited

U.S. PATENT DOCUMENTS

2013/0017855 A1* 1/2013 Hui ................. H04W 16/28
455/522
2017/0163392 A1* 6/2017 Lim ................. H04L 5/0032

FOREIGN PATENT DOCUMENTS

CN 103688583 A 3/2014

OTHER PUBLICATIONS

Wu et al.,"Cooperative Secondary Beam Selection for Cognitive Multiuser MIMO Transmission With Random Beamforming," IEEE Transactions on Cognitive Communications and Networking, vol. 2, No. 2, XP11621716AI, pp. 141-149, Institute of Electrical and Electronics Engineers, New York, New York (Jun. 2016).

(Continued)

*Primary Examiner* — Leila Malek
(74) *Attorney, Agent, or Firm* — Leydig, Voit & Mayer, Ltd.

(57) ABSTRACT

A processing device in a transmit-receive point for interference-aware beam pair selection, a transmit-receive point and a method are disclosed. The processing device is configured to select a beam pair from a set of candidate beam pairs (i, j), for setting up a communication link from a serving transmit device to a receive device via the selected beam pair, wherein each of the candidate beam pairs comprises a transmit beam j of the serving transmit device and a receive beam i of the receive device, wherein the selection is based on statistics of a usage of one or more interfering transmit beams (m, k) of one or more interfering transmit devices m, and k represents one or more transmit beams.

13 Claims, 23 Drawing Sheets

(58) Field of Classification Search
CPC . H04W 16/28; H04W 16/14; H04W 72/0413; H04W 72/042; H04W 74/006
USPC .......................................................... 375/267
See application file for complete search history.

(56) References Cited

OTHER PUBLICATIONS

"PRACH Preamble and Resource Allocation," 3GPP TSG RAN WG1 Meeting RAN1 #88, Athens, Greece, R1-1702184, pp. 1-5, 3rd Generation Partnership Project, Valbonne, France (Feb. 13-17, 2017).

"Cross-link interference management based on coordinated beamforming," 3GPP TSG RAN WG1 Meeting NR#3, Vagoya, Japan, R1-1716036, pp. 1-12, 3rd Generation Partnership Project, Valbonne, France (Sep. 18-21, 2017).

"Beam measurement and reporting," 3GPP TSG RAN WG1 Meeting #90bis, Prague, Czech Republic, R1-1717301, pp. 1-7, 3rd Generation Partnership Project, Valbonne, France (Oct. 9-13, 2017).

Tsang et al.,"Coding the Beams: Improving Beamforming Training in mmWave Communication System," IEEE Globecom 2011 proceedings, pp. 1-6, 3rd Generation Partnership Project, Valbonne, France, Institute of Electrical and Electronics Engineers, New York, New York (2011).

Bai et al.,"Coverage and Rate Analysis for Millimeter-Wave Cellular Networks," IEEE Transactions on Wireless Communications, vol. 14, No. 2, pp. 1100-1114, Institute of Electrical and Electronics Engineers, New York, New York (Feb. 2015).

Zhou et al., "Efficient Codebook-Based MIMO Beamforming for Millimeter-Wave WLANs," 2012 IEEE 23rd International Symposium on Personal, Indoor and Mobile Radio Communications—(PIMRC), pp. 1885-1889, Institute of Electrical and Electronics Engineers, New York, New York (2012).

Alkhateeb et al., "Initial Beam Association in Millimeter Wave Cellular Systems: Analysis and Design Insights," IEEE Transactions on Wireless Communications vol. 16, No. 5, pp. 2807-2821, Institute of Electrical and Electronics Engineers, New York, New York (May 2017).

Kim et al., "Inter-BS Interference-Aware Transmission Coordination for Millimeter Wave Networks," IEEE Wireless Communications Letters, vol. 6, No. 3, pp. 350-353, Institute of Electrical and Electronics Engineers, New York, New York (Jun. 2017).

Chae et al., "Interference Aware-Coordinated Beamforming in a Multi-Cell System," IEEE Transactions on Wireless Communications vol. 11, No. 10, pp. 3692-3703, Institute of Electrical and Electronics Engineers, New York, New York (Oct. 2012).

"On network beam switching and refinement (BM P-2)," 3GPP TSG-RAN WG1 #86bis, Lisbon, Portugal, R1-1609515, pp. 1-7, 3rd Generation Partnership Project, Valbonne, France (Oct. 10-14, 2016).

* cited by examiner

TECHNIQUES FOR INTERFERENCE-AWARE BEAM PAIR SELECTION

CROSS-REFERENCE TO RELATED APPLICATIONS

This application is a continuation of International Application No. PCT/EP2017/077671, filed on Oct. 27, 2017, the disclosure of which is hereby incorporated by reference in its entirety.

TECHNICAL FIELD

Embodiments of the present disclosure relate to techniques for interference-aware beam pair selection, in particular based on statistics. Embodiments of the disclosure further relates to a processing device and a method for interference-aware beam pair selection. The selection is based on statistics of a usage of one or more interfering transmit beams of one or more interfering transmit devices. Embodiments of the disclosure also relate to a transmit-receive point, e.g., a base station or a user equipment, including such processing device.

BACKGROUND

Wireless communication is often impaired by low signal-to-noise ratio (SNR) and adverse propagation effects. This is especially true for communication at higher frequencies, e.g., in the millimeter (mm) wave range. One technique for improving the communication (especially in the mm-wave range) involves directional transmissions. For example, beam sweeping over transmit (Tx) beams 111 at a transmit device 110 and over receive (Rx) beams 121 at a receive device 120 may be performed as shown, by way of example, in FIG. 1. The beem sweeping process enables the receive device 120 to obtain a signal strength with each of the possible beam pair (Tx beam, Rx beam) combinations. Signal strength with a given beam pair refers to the receive power of the channel provided by the given beam pair. The best beam pair (or pairs) for setting up a communication link (or for setting up respective communication links) is usually determined based on the SNR so that the best beam pair is the beam pair with the strongest signal. After determining the best beam pair (or the best beam pairs), the receive device 120 may communicate its preferred Tx beam (or its preferred Tx beams) to the transmit device 110. SNR-based beam pair selection, however, does not take the interference resulting from other (interfering) transmit devices into account.

A transmit device is a device for sending a transmission, and a receive device is a device for receiving the transmission. A transmit device and a receive device may be implemented in a single device; such a device may be referred to as a transmit-receive point (TRP). Examples of TRPs include access nodes, evolved NodeBs (eNBs), base stations (BSs), NodeBs, master eNBs (MeNBs), secondary eNBs (SeNBs), remote radio heads, access points, user equipments (UEs), mobiles, mobile stations, terminals, and the like.

Consider a downlink in a mm-wave network. In this example, the network is a cellular network. The downllink may, for example, be a transmission from a serving TRP, e.g., a base station (BS), 110 to a user equipment (UE) 120 in a given cell. Transmissions from interfering TRPs located in other cells may produce intercell interference at the UE 120. For example, when there is a dense deployment of TRPs, a UE may have a line of sight or a strong multipath interfering channel to interfering TRPs, in particular at the cell edge, as shown in FIG. 2. Ignoring such interference when selecting a beam pair may lead to selecting a beam pair (in particular a Rx beam) which may experience strong interference. This can result in a transmission with low signal-to-interference-plus-noise ratio (SINR). In FIG. 2, for example, the beam pair for the UE 212 in cell 1, 210 with the best SNR 213 corresponds to Tx beam #3 and Rx beam #4. However, the UE 212 in cell 1, 210 may experience strong interference 223, leading to a low SINR transmission, if TRP 2, 221 transmits in its own cell with Tx beam #9. The interference from interfering TRPs can be avoided if the UE 212 selects another beam pair for its transmission, but a problem is that the UE 212 is unaware of the Tx beams that the interfering TRPs 221 will employ.

SUMMARY

It is the object of the invention to provide efficient techniques for beam selection in radio communications.

This object is achieved by the features of the independent claims. Further implementation forms are apparent from the dependent claims, the description and the figures.

A basic idea of the invention as described hereinafter is to employ statistics of a Tx beams usage of interfering transmit devices, e.g., probabilities that an interfering transmit device will employ its Tx beams, in selecting a beam pair selection for establishing a channel from a serving transmit device to a receive device. This enables the receive device to take the potential interference that may be received on the different Rx beams into account without any explicit or instantaneous coordination, cooperation or agreement between the serving transmit device and the interfering transmit devices (e.g., between the serving TRP and the interfering TRPs). As will be detailed in the description of embodiments, the proposed technique can be performed at the receive device (e.g., at a UE) or at the serving transmit device, e.g., at the serving TRP.

For describing the idea, a downlink transmission from a TRP (as the serving transmit device; this TRP is referred to as the serving TRP) to a UE (as the receive device) is considered, where the UE receives interference from interfering TRPs (interfering transmit devices). The UE may be located in a cell associated with the TRP. The technique described in this disclosure can also be applied to other links, such as the uplink or sidelinks. As indicated above, interference can be avoided if the UE selects another Rx beam, but the problem is that the UE is unaware of the Tx beams which the interfering TRPs will employ. To deal with this problem, according to the disclosure, the UE selects its best beam pair (or its best beam pairs), in particular the Rx beam (or Rx beams), based on the potential interference from potential interferers. More specifically, the beam pair selection is based on the likelihood of these interfering transmit devices, e.g., interfering TRPs, to employ their Tx beams. For this, a processing device (e.g., in the UE or in the serving TRP) uses statistics of the Tx beams usage of the interfering TRPs, i.e. the probabilities that an interfering TRP will employ its Tx beams (wherein each of these probabilities relates to one Tx beam). Denote $p_{m,k}$ the probability that the m-th interfering TRP will employ its k-th Tx beam (with $k=\{1, \ldots, N_{T,m}\}$), where $N_{T,m}$ is the number of Tx beams at the m-th interfering TRP. The statistics of the Tx beam usage from the m-th interfering TRP can be summarized in a probability distribution function which can be denoted as $f_m(p)$, as illustrated in Table 1 below.

TABLE 1

| Probability distribution function $f_m(p)$ | |
|---|---|
| Tx Beam (k) | Probability |
| 1 | $p_{m,1}$ |
| 2 | $p_{m,2}$ |
| . | . |
| . | . |
| . | . |
| $N_{T,m}$ | $p_{m,N_{T,m}}$ |

Each TRP can keep track and compute its own statistics or probability distribution for its Tx beams usage based on previous transmissions by the respective TRP, i.e. the m-th TRP can compute $f_m(p)$. These probabilities or statistics of the Tx beams usage of an interfering TRP are expected to change slowly over time depending on the scheduling and current user distribution in the cell served by the interfering TRP.

The concept described in this disclosure makes use of these statistics for the beam pair selection, e.g., at the receive device. In this way, the potential interference which a receive device can experience is taken into account based on the probabilities of the interferers employing their Tx beams. Therefore, the proposed scheme can also be referred to as "Interference-Aware Beam Selection (IABS)". With the disclosed technique, no explicit coordination between the serving TRP and interfering TRPs is required for the Tx beam selection and the UE does not need to know which Tx beams the interfering TRPs will employ. The UE, however, takes into account the potential interference for the beam pair selection by not using Rx beams which could receive strong interference based on how likely it is for the interfering TRPs to employ their Tx beams. This leads to the advantage that the selected beam pair will achieve on average a better SINR for the data transmission than with the beam pair corresponding to the best SNR.

For this purpose, the UE needs to know, for each of its receive beams, the interfering signal strength from its strongest interfering TRPs, i.e. the interference on the different pairs of interfering Tx beams (generated by the interfering TRPs) and Rx beams (generated by the UE), as well as the desired signal strength on the different beam pairs to its connected (i.e. serving) TRP as shown in FIG. 2. The desired and interfering signal strengths on all beam pairs can be obtained by operating the TRPs to perform beam sweeping with different sequences or pilots, i.e. synchronization signals, allowing UEs to identify their serving TRPs (e.g., as in current systems), and to identify the strongest interfering TRPs. The interfering signal strength may also be obtained (over long term) by operating the UE to overhear the Tx beams employed for data transmission by the interfering TRPs (e.g., via dedicated training).

The statistics of the Tx beams usage may be exchanged between TRPs or between a TRP and the UE or vice versa.

In order to describe the invention in detail, the following terms, abbreviations and notations will be used:
TRP: Transmit-Receive-Point
UE: User Equipment
BS: Base Station, eNodeB
IABS: Interference Aware Beam Selection
SNR: Signal-to-Noise Ratio
CSI: Channel State Information
Tx: Transmit
Rx: Receive
DL: Downlink
UL: Uplink According to a first aspect, the invention relates to a processing device for interference-aware beam pair selection, in particular a processing device in a transmit-receive point, e.g., in a user equipment or in a base station, wherein the processing device is configured to select a beam pair from a set of candidate beam pairs (i, j), for setting up a communication link from a serving transmit device to a receive device via the selected beam pair, wherein each of the candidate beam pairs comprises a transmit beam j of the serving transmit device and a receive beam i of the receive device, wherein the selection is based on statistics of a usage of one or more interfering transmit beams (m, k) of one or more interfering transmit devices m.

The processing device may comprise processing circuitry configured to carry out the various operations of the processing device described in this disclosure. Similarly, a transmit device as denoted above may comprise, for example, processing circuitry, a transmitter, and an antenna, interconnected and configured to perform the various operations described in the present disclosure. Similarly, a receive device may comprise, for example, processing circuitry, a receiver, and an antenna. The term processing circuitry may encompass any kind of signal or data processing circuitry, programmable or non-programmable. The processing circuitry may comprise, for example, a processor and a memory connected to the processor, the memory carrying a program for instructing the processor to carry out operations for providing functionalities of a device (e.g., a processing device, a transmit device, or receive device) that comprises the processing circuitry.

It is understood that the word "interfering" in the expressions "interfering transmit beams" and "interfering transmit devices" should be interpreted as "potentially interfering".

The set of candidate beam pairs may be a finite set or an infinite set. In particular, the set of beam pairs may be continuous. In one implementation, "selecting" comprises determining geometrical characteristics of the receive beam i and/or geometrical characteristics of the transmit beam j. The geometrical characteristics may notably include a beam direction. They may further include a beam width, for example.

By employing the statistics of the Tx beams usage of the interfering transmitters, e.g., Tx beam employment probabilities of the interfering transmitters, for the beam pair(s) selection (e.g., at the receive device), such a processing device provides for efficient beam selection in mobile radio communications. This enables the receive device to account for the potential interference that may be received on the different Rx beams without any explicit or instantaneous coordination, cooperation or agreement between the serving transmit device and the interfering transmit devices.

In an exemplary implementation form of the processing device, the statistics comprise one or more beam usage probability values $p_{mk}$ associated one-to-one with the one or more interfering transmit beams (m, k), each of the beam usage probability values $p_{mk}$ representing a probability of a usage of the respective interfering transmit beam (m, k).

This provides the advantage that the receive device can select another Rx beam if one Rx beam has a high probability of strong interference, thereby making transmission more reliable.

In an exemplary implementation form the processing device is configured to select the beam pair from the set of candidate beam pairs by: determining for each of the candidate beam pairs (i, j) a score SCR(i, j) based on the statistics of the usage of the one or more interfering transmit beams (m, k); and selecting, from the set of candidate beam pairs, a beam pair that has obtained a highest score.

This provides the advantage that a specific quantity, i.e. the score SCR(i, j) can be efficiently determined for beam pair selection. Hence, beam pair selection can be easily and efficiently performed by the processing device. In addition, further beam pairs may also be selected based on the score SCR(i, j).

In an exemplary implementation form the processing device is configured to determine for each of the candidate beam pairs (i, j) the respective score SCR(i, j) based further on the following: a signal strength descriptor of the respective candidate beam pair (i, j); and one or more signal strength descriptors associated one-to-one with one or more interfering beam pairs (i, m, k), each of the one or more interfering beam pairs comprising the receive beam i of the respective candidate beam pair and one of the interfering transmit beams (m, k).

A signal strength descriptor of a beam pair can be any kind of information that specifies or correlates with a stipulated, estimated, or measured signal strength of the signal received via the beam pair. The signal strength may be a signal-to-noise ratio (SNR).

This provides the advantage that the signal strength can be efficiently computed and beam pair selection can be efficiently processed.

In an exemplary implementation form of the processing device, the score for the n-th receive device is defined as:

$$SCR(i, j) = \frac{S_{i,j}(n)}{\sum_{m \in M_n} \sum_{k=1}^{N_{T,m}} p_{m,k} I_{m,i,k}(n) + \sigma_n^2}, \quad (1)$$

where $s_{i,j}(n)$ denotes a signal strength of the beam pair formed of the j-th transmit beam and the i-th receive beam combination for an n-th receive device, $N_{T,m}$ denotes the number of transmit beams at the m-th interfering transmit device, $\sigma_n^2$ denotes a noise variance and $M_n$ denotes a set of strongest interfering transmit devices for the n-th receive device.

This provides the advantage that by applying simple arithmetic operations, an accurate score making use of the statistics of the usage of the one or more interfering transmit beams can be computed.

In an exemplary implementation form the processing device is configured to distinguish between the interfering transmit beams of the interfering transmit devices and the transmit beams of the serving transmit device based on transmit device-specific pilot signals, i.e. synchronization signals.

Such transmit device-specific pilot signals allow an easy separation between interference and serving signals at the receive device.

According to a second aspect, the invention relates to a transmit-receive point, in particular a base station or a user equipment, comprising the processing device according to the first aspect described above.

This provides the advantage that the processing device can be flexibly applied. The transmit-receive point may operate as a transmit device or a receive device, i.e. an access point that can transmit and/or receive as described before. It can notably be a base station or a user equipment.

In an exemplary implementation form the transmit-receive point is configured to signal the transmit beam j of the selected beam pair to the serving transmit device.

This provides the advantage that the serving transmit device obtains information about the selected beam pair and can, for example, set up a communication link with the selected transmit beam.

According to a third aspect, the invention relates to a transmit-receive point, in particular a base station, configured to receive statistics of a usage of one or more interfering transmit beams (m, k) of one or more interfering transmit devices m.

The transmit-receive point may operate as a serving transmit-receive point. The one or more interfering transmit devices may, in particular, be other transmit-receive points, e.g., base stations. The serving transmit-receive point may be configured to receive the statistics from the one or more interfering transmit devices m, e.g., by wireless communication from the interfering transmit devices to the serving transmit-receive point.

This provides the advantage that by receiving statistics of the usage of one or more interfering transmit beams (m, k) the serving transmit-receive point can consider the likelihood for these interfering transmit beams to be employed for setting up a communication link.

In an exemplary implementation form the transmit-receive point is configured to forward the statistics to a user equipment in order to enable the user equipment to select a beam pair based on the statistics, and further configured to communicate with the user equipment via the selected beam pair.

By having the statistics of the Tx beams usage of the interfering transmit devices, the user equipment can perform a better beam pair selection.

In an exemplary implementation form the transmit-receive point is configured to: communicate with the user equipment via one or more transmit beams of the transmit-receive point; forward the statistics to the user equipment via the one or more first transmit beams; receive a transmit beam identifier from the user equipment, the transmit beam identifier indicating a selected transmit beam of the transmit-receive point; and continue communicating with the user equipment via the selected transmit beam.

This provides the advantage of a flexible communication scheme that is robust against interference.

The statistics may also be forwarded from the transmit-receive point to the user equipment in another way (e.g., at lower frequencies). In case it is done via transmit beams, they may be forwarded via one first transmit beam, for example, or alternatively by using multiple transmit beams.

According to a fourth aspect, the invention relates to a transmit-receive point, in particular a base station, configured to generate one or more transmit beams k and to provide statistics of a usage of the one or more transmit beams k.

By providing the statistics of a usage of the one or more transmit beams k the transmit-receive point can make aware other transmit-receive points about potential interference conditions for setting up a communication link.

In one implementation form, the transmit-receive point may operate as an interfering transmit device.

In an exemplary implementation form the transmit-receive point is configured to derive the statistics from current or past employment of the one or more transmit beams.

This provides the advantage that the statistics can be easily derived by simply logging employment of the transmit beams.

In an exemplary implementation form the transmit-receive point is configured to transmit the statistics to another transmit receive point, in particular a base station or a user equipment.

This provides the advantage that the statistics can be shared within the network.

According to a fifth aspect, the invention relates to a method for interference-aware beam selection, the method comprising: selecting a beam pair from a set of candidate beam pairs (i, j), for setting up a communication link from a serving transmit device to a receive device via the selected beam pair, wherein each of the candidate beam pairs comprises a transmit beam j of the serving transmit device and a receive beam i of the receive device, wherein the selection is based on statistics of a usage of one or more interfering transmit beams (m, k) of one or more interfering transmit devices.

By employing the statistics of the Tx beams usage of the interfering transmit devices, i.e. the probabilities for an interfering transmit device to employ its Tx beams, for the beam pair(s) selection at the receive device such a method provides an efficient solution for beam selection in mobile radio communications. This enables the receive device to consider the potential interference that could be received on the different Rx beams without any explicit or instantaneous coordination, cooperation or agreement between the serving transmit device and the interfering transmit devices.

BRIEF DESCRIPTION OF THE DRAWINGS

Further embodiments of the invention will be described with respect to the following figures, in which:

FIG. 11 schematically shows an exemplary message sequence 1100 according to an Embodiment 1a;

FIG. 14 schematically shows an exemplary message sequence 1400 according to an Embodiment 2a;

DETAILED DESCRIPTION OF THE EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may also be implemented in wireless communication networks based on mobile communication standards similar to, e.g., LTE, in particular 4.5G, 5G and beyond. The methods and devices described herein may also be implemented in wireless communication networks, in particular communication networks similar to WiFi communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz.

The devices and systems described herein may include processors, memories and transceivers, i.e. transmitters and/or receivers. In the following description, the term "processor" describes any device that can be utilized for processing specific tasks (or blocks or steps). A processor can be a single processor or a multi-core processor or can include a set of processors or can include means for processing. A processor can process software or firmware or applications etc.

Figure 1:
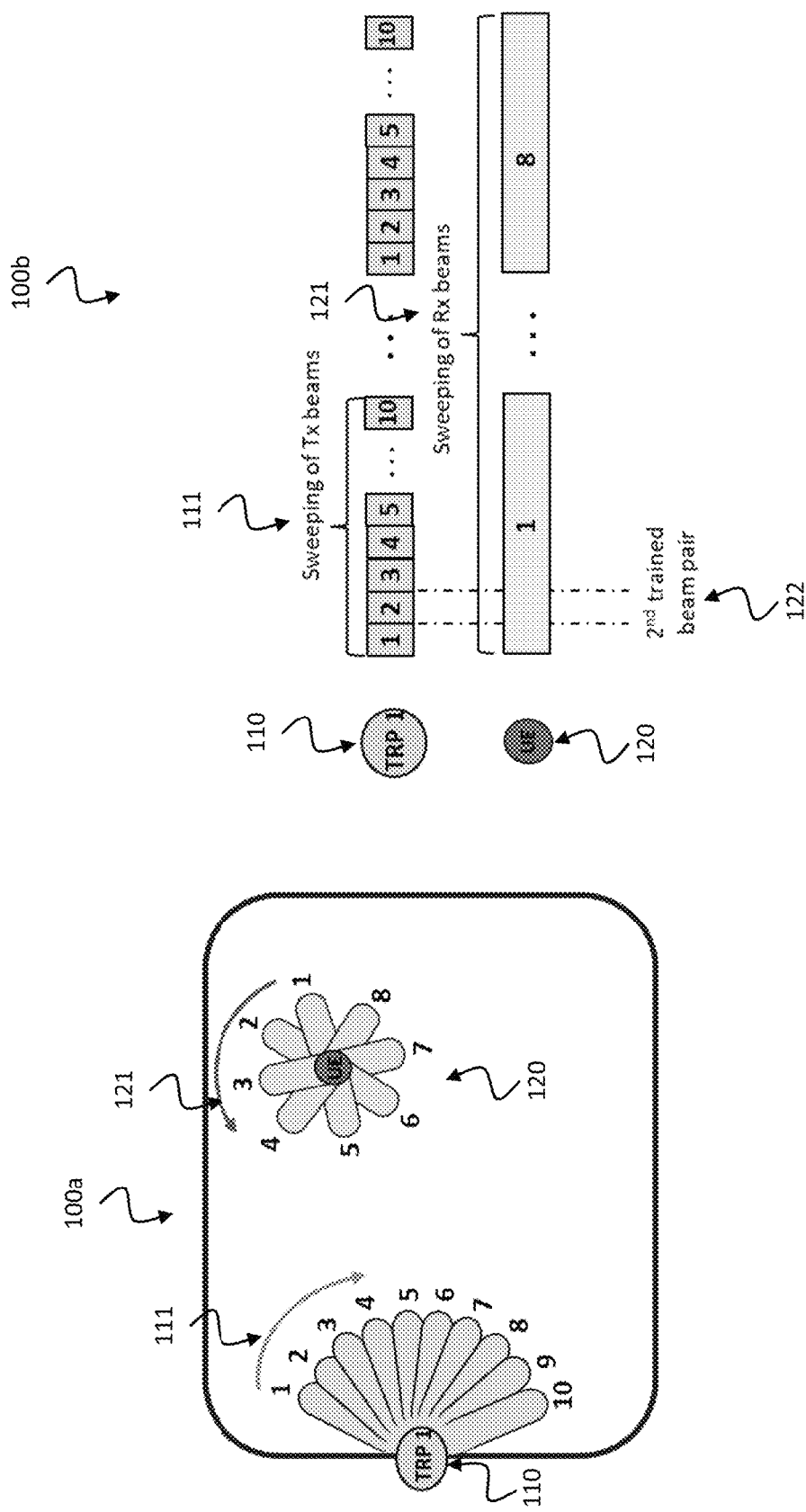
FIG. 1 shows a diagram illustrating a beam sweeping procedure 100a, 100b between a serving transmit-receive point (TRP) 110 and a user equipment (UE) 120 in a mobile communications system. The TRP shown in FIG. 1 and in the following figures may be a base station.

FIG. 1 shows a diagram illustrating a beam sweeping procedure 100a, 100b between a serving transmit device, e.g., a serving transmit-receive point (TRP), 110 and a receive device, e.g., a user equipment (UE), 120 in a mobile communications system. The TRPs shown in the figures may be base stations.

In the mobile communications system 100a, 100b, beam sweeping over the transmit (Tx) beams 111 at the serving transmit device 110 and over the receive (Rx) beams 121 at the receive device 120 is performed, which enables the receive device 120 to obtain the signal strength with each of the possible beam pair (Tx beam, Rx beam) combinations. Signal strength with a given beam pair refers to the receive power of the channel resulting with the given beam pair. The best beam pair(s) for setting up a communication link(s) is usually determined based on the SNR, i.e. the best beam pair corresponds to the beam pair with the largest signal strength. After determining the best beam pair(s), the receive device 120 communicates its preferred Tx beam(s) 122 to the serving transmit device 110.

Figure 2:
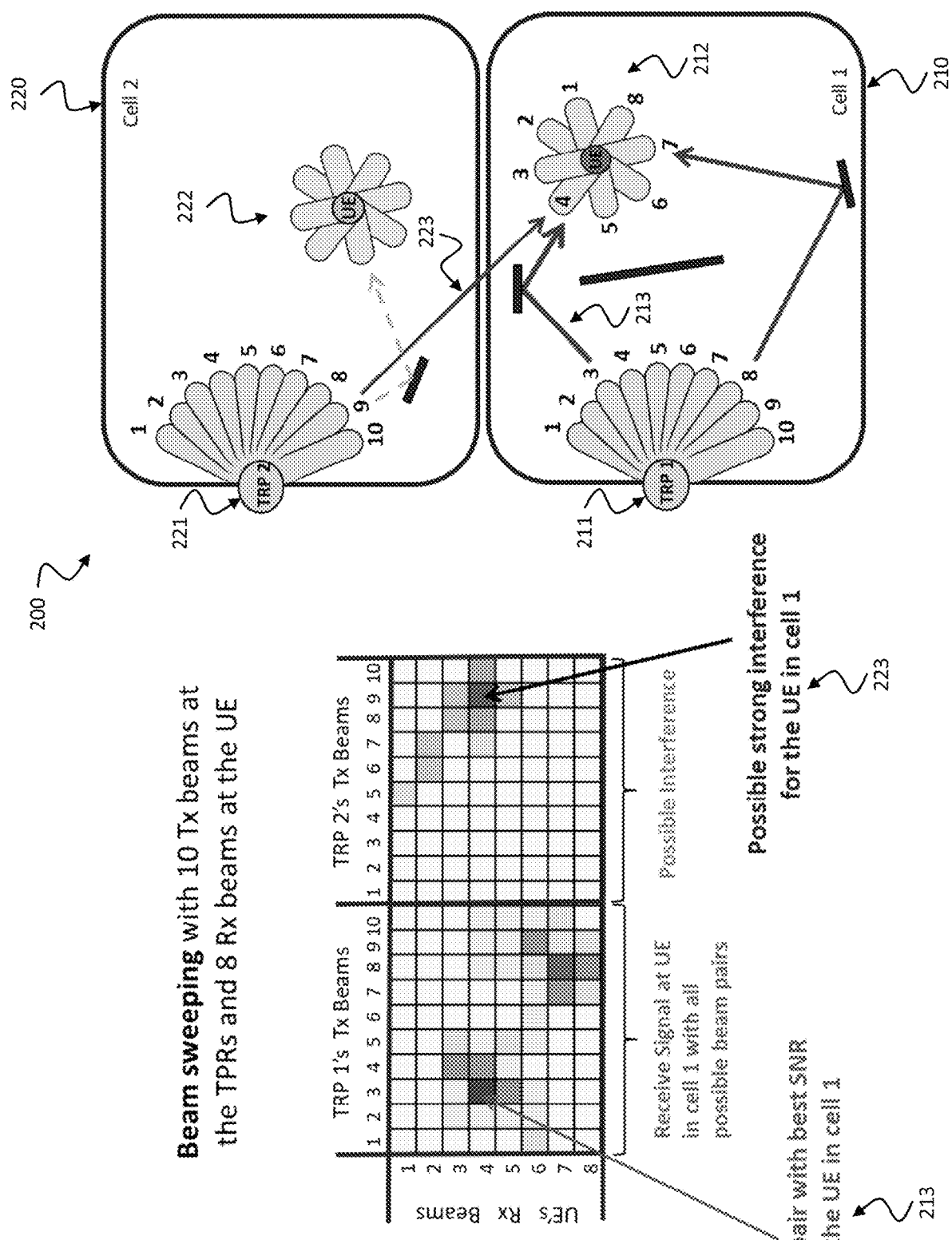
FIG. 2 shows a diagram illustrating a scenario of the mobile communications system 200 where transmission from interfering TRPs 221 in their respective cells 220 results in intercell interference 223.

FIG. 2 shows a diagram illustrating a scenario of the mobile communications system 200 where transmission from interfering transmit devices, i.e interfering TRPs, 221 in their respective cells 220 results in intercell interference 223.

In the case of dense deployments of TRPs a UE may have a line of sight or a strong multipath to interfering TRPs, in particular at the cell edge, as shown in FIG. 2. Thus, ignoring the interference for the beam pair selection might lead to selecting a beam pair (in particular a Rx beam) which could experience strong interference and result in a transmission with low SINR. In FIG. 2, for example, the beam pair for the UE 212 in cell 1, 210 with the best SNR 213 corresponds to Tx beam #3 and Rx beam #4. However, the UE 212 in cell 1, 210 could experience strong interference 223, leading to a low SINR transmission, if TRP 2, 221 transmits in its own cell with Tx beam #9. The interference from interfering TRPs can be avoided if the UE 212 selects another beam pair for its transmission, but the problem is that the UE 212 is unaware of the Tx beams that the interfering TRPs 221 will employ.

Figure 3:
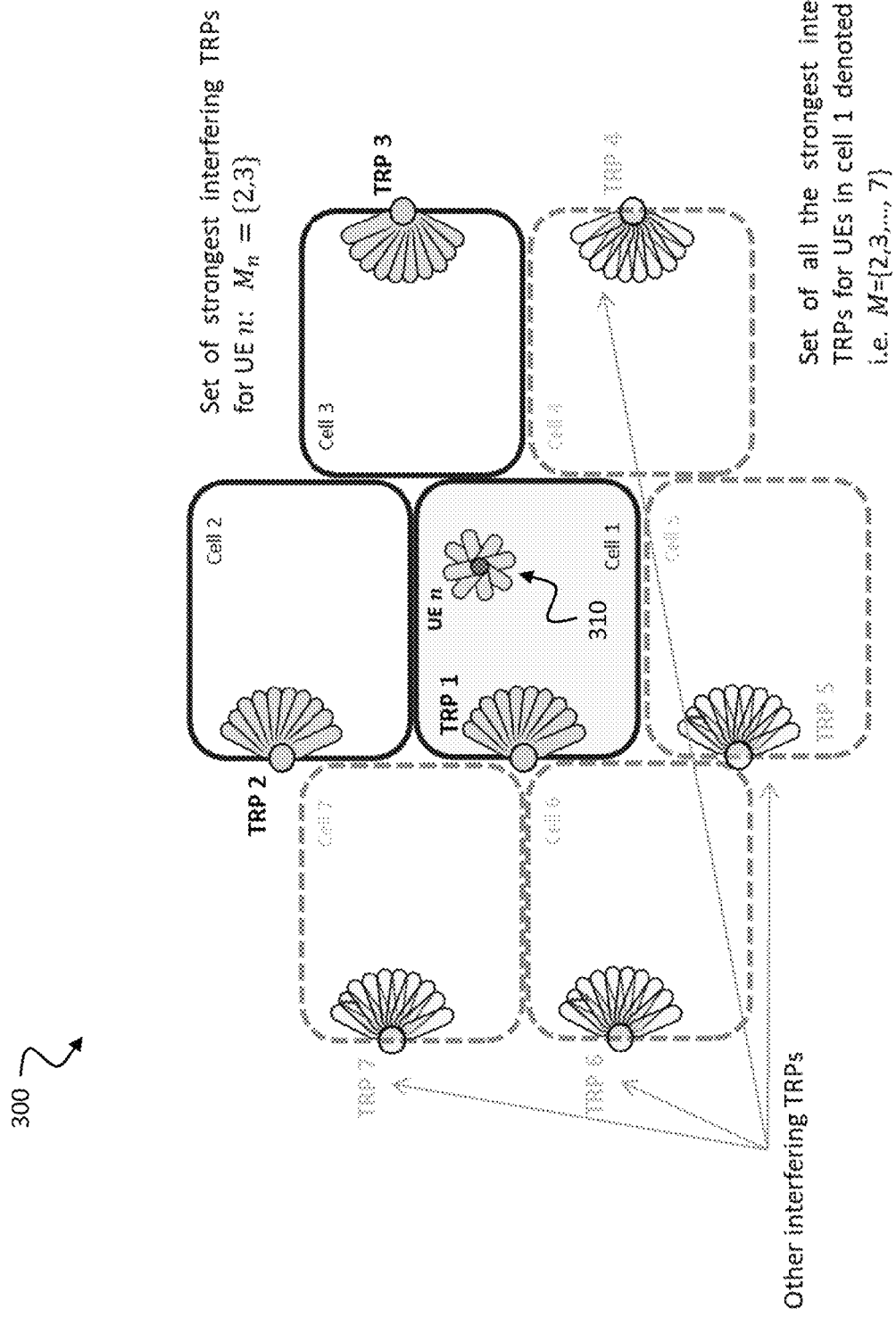
FIG. 3 shows a diagram illustrating an exemplary layout 300 with the strongest interfering TRPs for UE n consisting of TRP 2 and TRP 3.

FIG. 3 shows a diagram illustrating an exemplary layout 300 with the strongest interfering TRPs for UE n 310 consisting of TRP 2 and TRP 3. For further explanations, consider the transmission from the serving TRP 1 to the n-th UE (also referred to as UE n 310) in cell 1 with the set of all the strongest interfering TRPs for UEs in cell 1 denoted by M and given by TRPs m=2, . . . , 7 as indicated in FIG. 3, i.e. M={2, 3, . . . , 7}. Note that not all the interfering TRPs in the set M correspond to the strongest interfering TRPs of a given UE 310 in cell 1, as the strongest interfering TRPs experienced by the UEs in cell 1 can be distinct among different UEs, e.g., depending on the UE's location in the cell. The set of the strongest interfering TRPs for the n-th UE is denoted as $M_n$ and hence, in this example layout 300 the strongest interfering TRPs for UE n 310 are from the set $M_n$={2, 3} as shown in FIG. 3.

Figure 4:
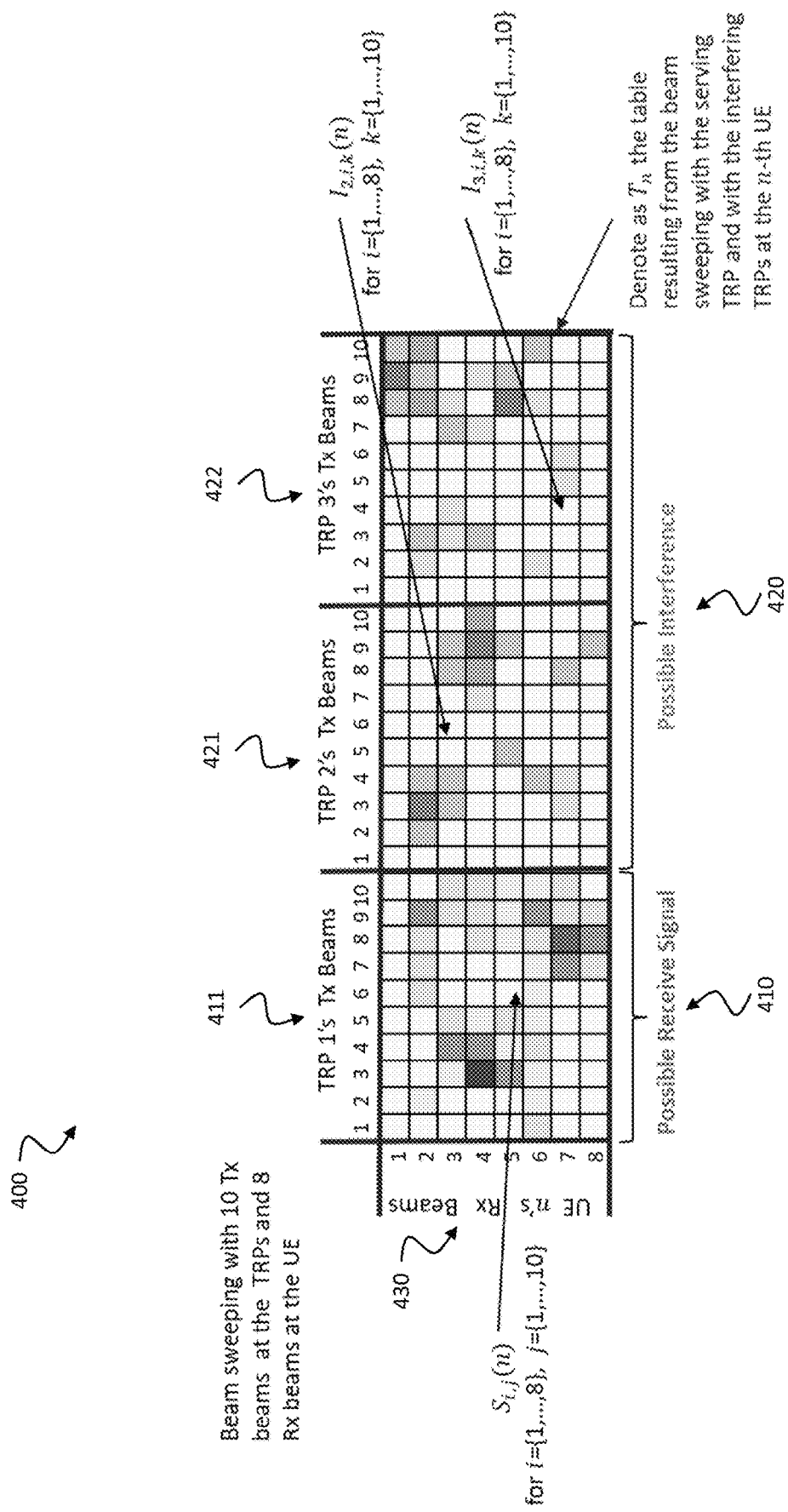
FIG. 4 shows a diagram 400 illustrating desired and interfering signal strength at the UE on the different beam pairs from the serving TRP and the interfering TRPs, respectively.

FIG. 4 shows a diagram 400 illustrating desired and interfering signal strength at the UE on the different beam pairs from the serving TRP and the interfering TRPs, respectively. The left block of the diagram 400 denotes TRP1 Tx beams 411 versus UE n Rx beams 430. The middle block of the diagram 400 denotes TRP2 Tx beams 421 versus UE n Rx beams 430. The right hand side block of the diagram 400 denotes TRP3 Tx beams 422 versus UE n Rx beams 430. A possible receive signal 410 is formed from the left hand side block of combinations of TRP1 Tx beams 411 with UE n Rx beams 430.

A possible interference 420 is formed from the middle block of combinations of TRP2 Tx beams 421 with UE n Rx beams 430 and from the right hand side block of combinations of TRP3 Tx beams 422 with UE n Rx beams 430. The whole table shown in FIG. 4 can be denoted as $T_n$, i.e. the table resulting from the beam sweeping with the serving TRP and with the strongest interfering TRPs at the n-th UE.

Furthermore, define the receive signal strength at the n-th UE as $S_{i,j}$ (n) with the j-th Tx beam and the i-th Rx beam between the serving TRP and the n-th UE. In addition, define the interfering signal strength at the n-th UE as $I_{m,i,k}$ (n) with the k-th Tx beam and the i-th Rx beam between the m-th interfering TRP and the n-th UE. These variables are depicted in FIG. 4 for a scenario with TRP 1 serving UE n in the downlink of cell 1 with TRP 2 and TRP 3 as the strongest interfering TRPs for UE n, i.e. $M_n$={2,3}, assuming the number of Tx beams at the m-th interfering TRP is equal to 10, i.e. $N_{T,m}$=10, whereas the number of Rx beams at the UE is equal to 8. In general the number of Tx beams of different TRPs do not need to be the same. Given the desired signal and interference measurements, UE n can collect the desired and interfering signal strengths on all beam pairs into a table denoted as $T_n$ as shown in FIG. 4.

Figure 5:
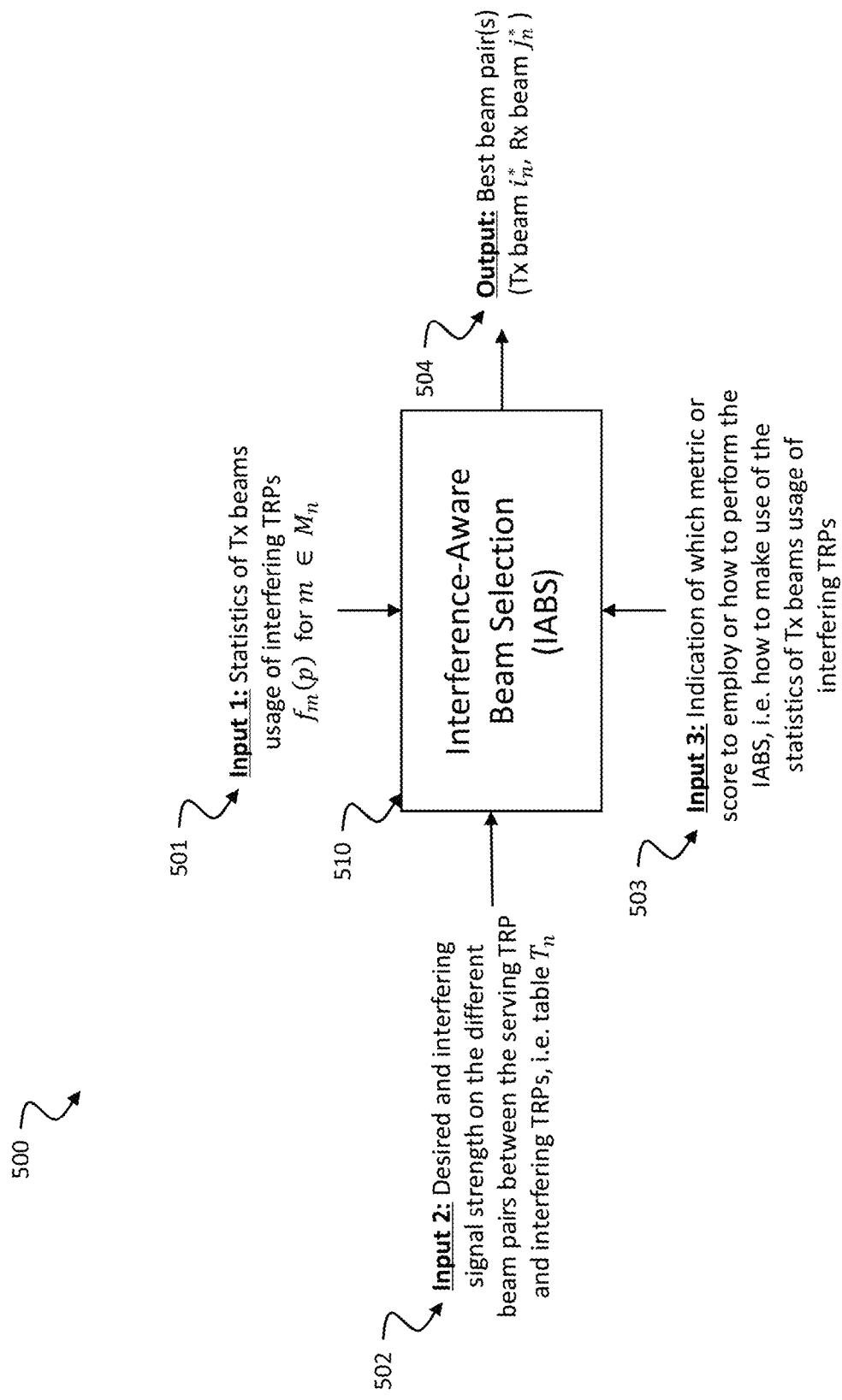
FIG. 5 shows a diagram 500 illustrating schematically the general idea according to the disclosure.

FIG. 5 shows a diagram 500 illustrating the general idea according to the disclosure.

With the desired signal and interference measurements in table $T_n$ and the statistics of the Tx beams usage of the interering TRPs, i.e. $f_m$ (p) form m∈$M_n$, the UE can proceed to perform the interference-aware beam selection as shown in FIG. 5.

The interference-aware beam selection (TABS) 510 can output the best beam pair(s) (Tx beam and Rx beam) based on three inputs: The first input 501 includes the statistics of Tx beams usage of interfering TRPs $f_m$(p) for m∈$M_n$. The second input 502 includes desired and interfering signal strength on the different beam pairs between the serving TRP and interfering TRPs, i.e. table $T_n$. The third input 503 includes an indication of which metric or score to employ or how to perform the IABS, i.e. how to make use of the statistics of Tx beams usage of interfering TRPs.

Which metric or score is considered for determining the beam pair depends, among other things, on the, requirements of the receive device, e.g., UE, and is implementation dependent. The TRP can signal the applicable metric or score to the UE, or signal to the UE how to perform the IABS 510 as shown in FIG. 5. For example, the best beam pair $(i_n^*, j_n^*)$, i.e. $j_n^*$-th Tx beam and $i_n^*$-th Rx beam for the n-th user can be selected as follows:

$$(i_n^*, j_n^*) = \underset{i,j}{\mathrm{argmax}} \frac{s_{i,j}(n)}{\sum_{m \in M_n} \sum_{k=1}^{N_{T,m}} p_{m,k} I_{m,i,k}(n) + \sigma_n^2}, \quad (2)$$

where $N_{T,m}$ is the number of Tx beams at the m-th interfering TRP, $\sigma_n^2$ is the noise variance and $M_n$ is the set of the strongest interfering TRPs for the n-th UE. The argmax operator is performed over all beam pair combinations. In other words, the best beam pair is chosen among all beam pair combinations such that the metric or score $$SCR(i, j) = \frac{s_{i,j}(n)}{\sum_{m \in M_n} \sum_{k=1}^{N_{T,m}} p_{m,k} I_{m,i,k}(n) + \sigma_n^2} \quad (3)$$

is maximized. Secondary beam pairs can be obtained in a similar manner. Afterwards, the UE can communicate to the serving TRP the selected beam pair(s).

Note that there a various possible ways of defining the metric or score. For instance, for ultra-reliable communication the score may be a function of the maximum potential interference from each interfering TRP. Based on the current requirements, the serving TRP can inform the UEs which metric to employ, as illustrated by the example in FIG. 5. Furthermore, the serving TRP can also signal to the UEs whether to perform IABS or not, i.e. based on their signal strength and interference. The technique can also be applied to the case of multiple receive devices, e.g., multiple UEs in a cell.

The disclosed idea can be implemented without increasing delay or overhead associated with the CSI feedback from the UEs and the CSI exchange between TRPs, for enabling a coordinated beam pair(s) selection between TRPs, by performing interference-aware beam pair selection in a distributed manner at the UE(s). Although some CSI exchange between TRPs is considered for some of the embodiments of the idea, this exchange does not take place for each beam pair selection (scheduling period) and hence, it still leads to a reduced overhead compared to coordinated techniques. Although the statistics of the Tx beams usage can be updated at each TRP after each transmission in its respective cell, they only need to be exchanged with other TRPs when the statistics have significantly changed. TRPs can therefore exchange statistics at time intervals that are longer than to the scheduling period.

Figure 6:
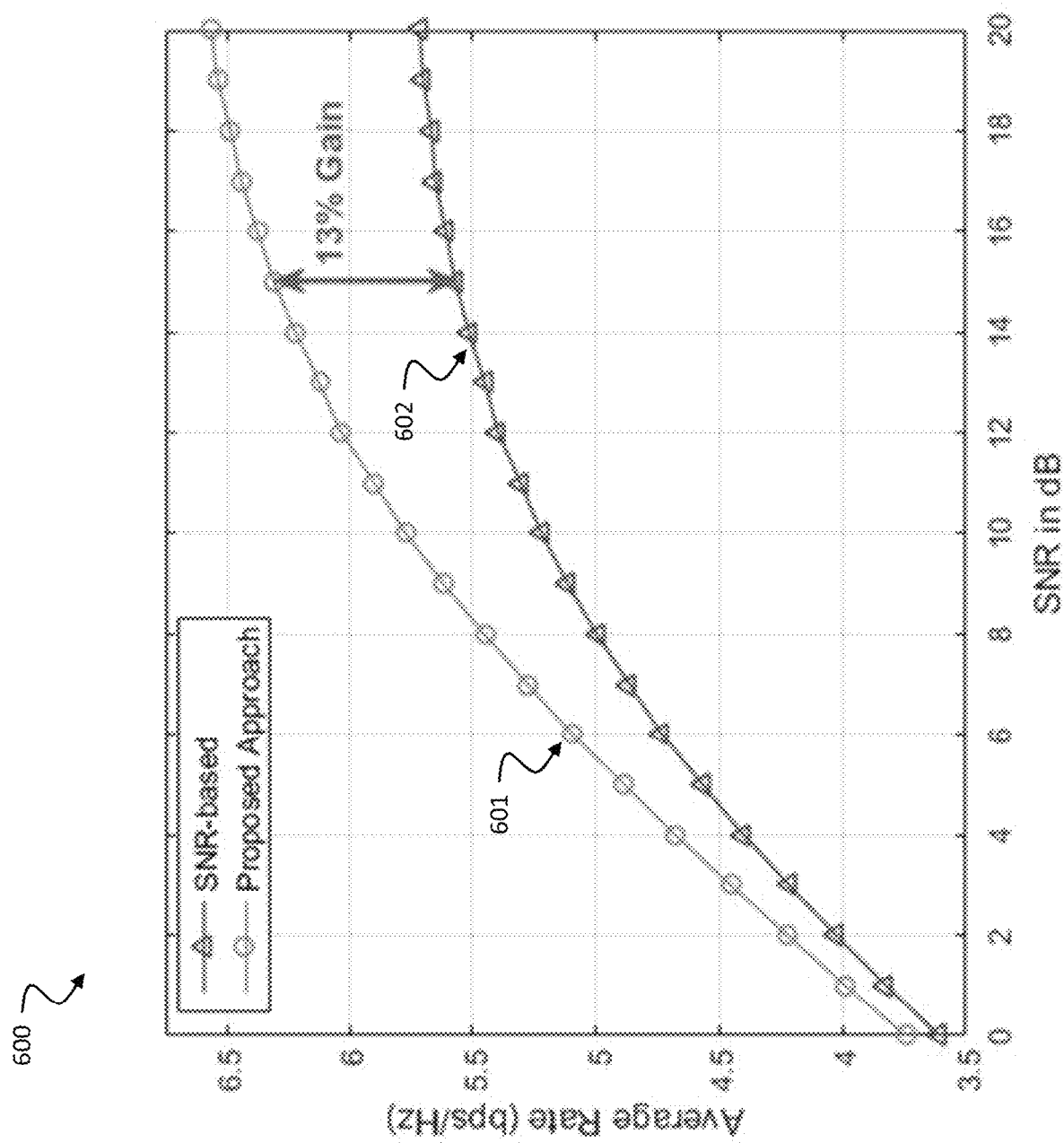
FIG. 6 shows a performance diagram 600 illustrating performance gain of the disclosed technique over SNR-based beam selection.

FIG. 6 shows a performance diagram 600 illustrating performance gain of the disclosed technique over SNR-based beam selection.

The performance gain achieved with the disclosed technique and employing the metric of Eq. 3 for selecting the beam selection is shown in FIG. 6 for the case of a single UE served by a serving TRP in the downlink of a cell with 2 interfering TRPs. The channel from each TRP to the UE comprises 3 paths, with unit power on the paths to the serving TRP and −1 dB power on the interfering paths, i.e. we assume the UE to be at the cell edge. We assume the probability distribution $f_m(p)$ (statistics of the Tx beams usage) of the interfering TRPs to be given by a truncated Gaussian distribution with different mean values. The number of Tx beams at each TRP is $N_{T,m}=64$ and at the UE is equal to 16. As shown in FIG. 6, the proposed (disclosed) technique 601 outperforms the conventional SNR-based beam selection 602, which does not consider the interference. The disclosed idea 601 avoids potential intercell interference by selecting other beam pairs compared to the SNR-based technique 602, which leads to an SINR for the UE's data transmission which is on average better than when ignoring the interference. For instance, for the given scenario at an SNR=10 dB, the Rx beam selected with the disclosed idea 601 is 65% of the time different than the one resulting with the SNR-based beam selection 602.

Figure 7:
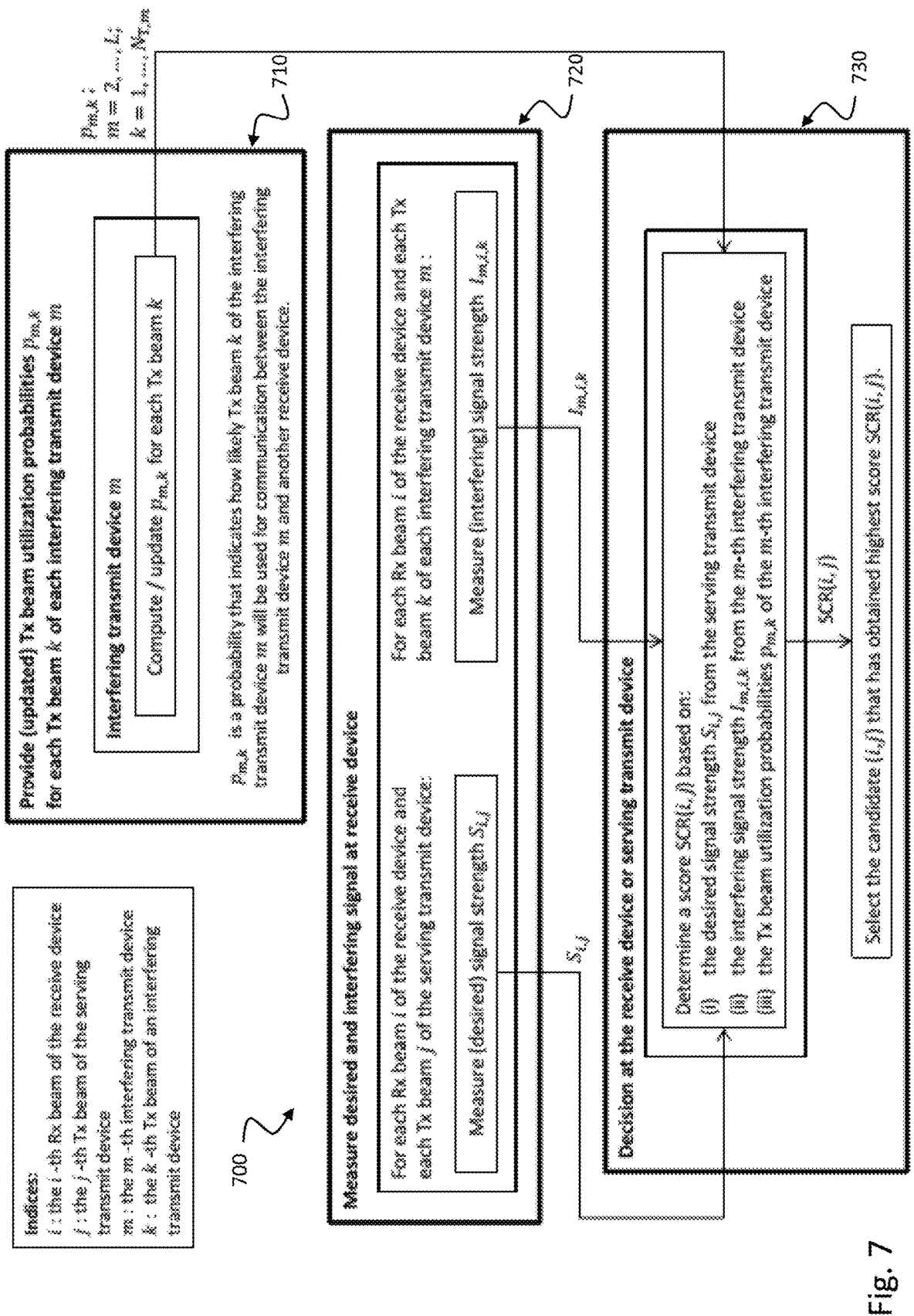
FIG. 7 shows a flow chart 700 of an example of a main embodiment.

FIG. 7 shows a first flow chart of an example of a main embodiment 700 involving a serving transmit device and a receive device with L−1 interfering transmit devices. In the flow chart, the three main operations are indicated, i.e. providing 710 the statistics or probabilities of the Tx beams usage of the interfering transmit devices, measuring 720 the desired and interfering signal strength on all beam pairs, and a decision 730 for selecting the best beam pair based on a metric or score.

The first operation 710 includes: Provide (updated) Tx beam utilization probabilities $p_{m,k}$ for each Tx beam k of each interfering transmit device m; for the interfering transmit device m, 711: Compute or update 712 $p_{m,k}$ for each Tx beam k. $p_{m,k}$ is a probability that indicates how likely it is that Tx beam k of interfering transmit device m will be used for communication between the interfering transmit device m and another receive device. Results $p_{m,k}$; m=2, ..., L; k=1, ..., $N_{T,m}$ are provided to the third operation 730.

The second operation 720 includes: Measure desired and interfering signal at the receive device. For each Rx beam i of the receive device and each Tx beam j of the serving transmit device: Measure 722 (desired) signal strength $S_{i,j}$ (the expression "desired signal strength" means the signal strength of the desired signal). For each Rx beam i of the receive device and each Tx beam k of each interfering transmit device m: Measure 723 (interfering) signal strength $I_{m,i,k}$. Outputs are provided to the third operation 730.

The third operation 730 includes: Decision (e.g., at the receive device or at the serving transmit device); Determine 732 a score SCR(i, j) based on: the desired signal strength $S_{i,j}$; the interfering signal strength $I_{m,i,k}$ from the m-th interfering transmitter; the Tx beam utilization probabilities $p_{m,k}$ of the m-th interfering transmitter; Select the candidate (i,j) that has obtained highest score SCR(i, j).

Figure 8:
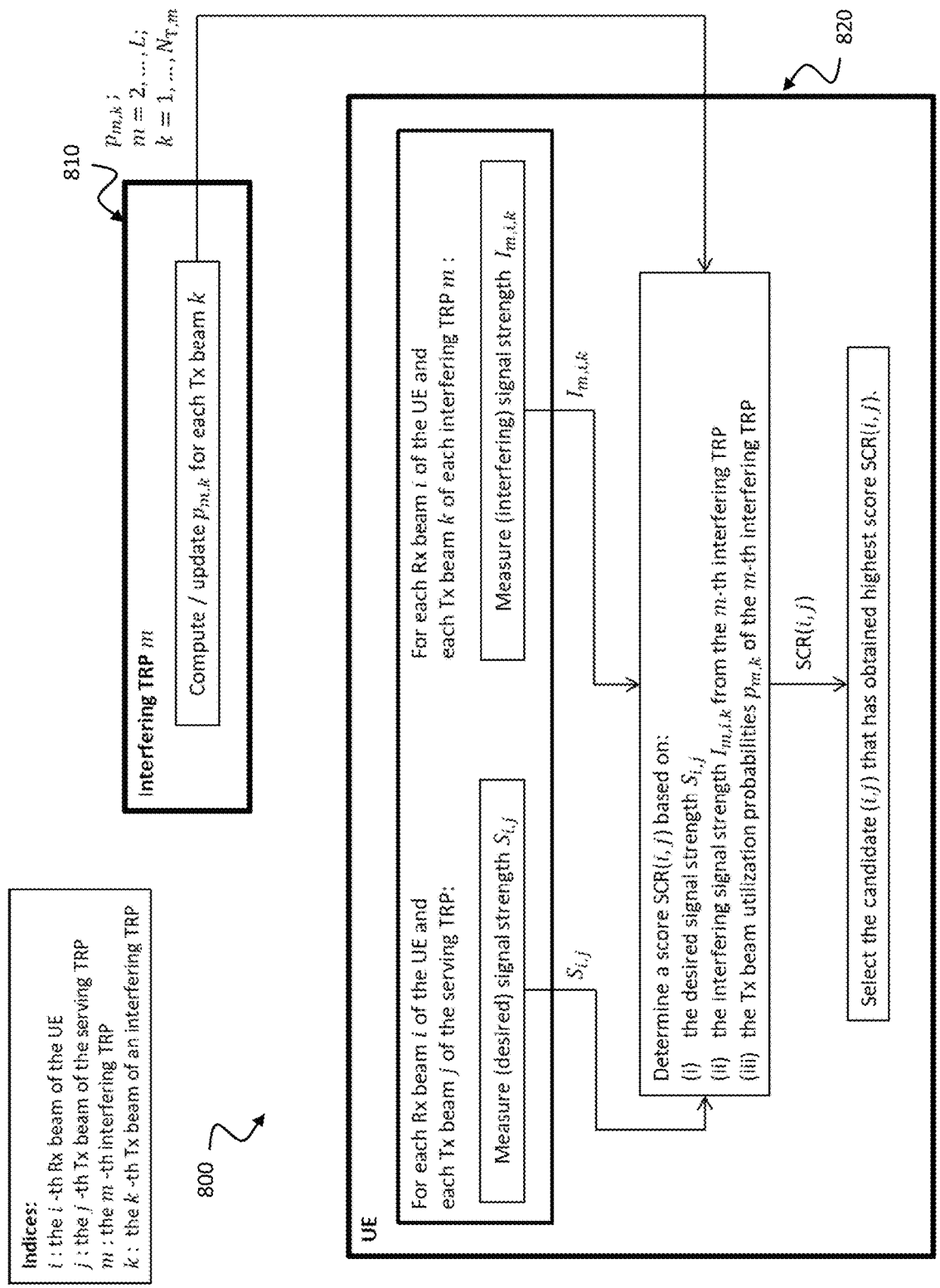
FIG. 8 shows a flow chart 800 of a particular embodiment where the IABS is performed at the UE.

FIG. 8 shows a flow chart of an example of an embodiment 800 where the IABS is performed at the UE 820. In this example, a serving TRP is communicating with a UE 820. The UE 820 receives interference from L−1 interfering TRPs 810. The IABS is performed at the UE 820. In this example, it is assumed that the UE 820 has already been informed which score to use for performing the IABS.

In the interfering TRP m 810, the following operations are performed: Compute/update $p_{m,k}$ for each Tx beam k. In the UE 820, the following operations are performed: For each Rx beam i of the UE and each Tx beam j of the serving TRP: Measure (desired) signal strength $S_{i,j}$. For each Rx beam i of the UE and each Tx beam k of each interfering TRP m: Measure (interfering) signal strength $I_{m,i,k}$. Then, determine a score SCR(i, j) based on: the desired signal strength $S_{i,j}$; the interfering signal strength $I_{m,i,k}$ from the m-th interfering TRP; the Tx beam utilization probabilities $p_{m,k}$ of the m-th interfering TRP. Then, candidate (i,j) is selected that has obtained highest score SCR(i, j).

Figure 9:
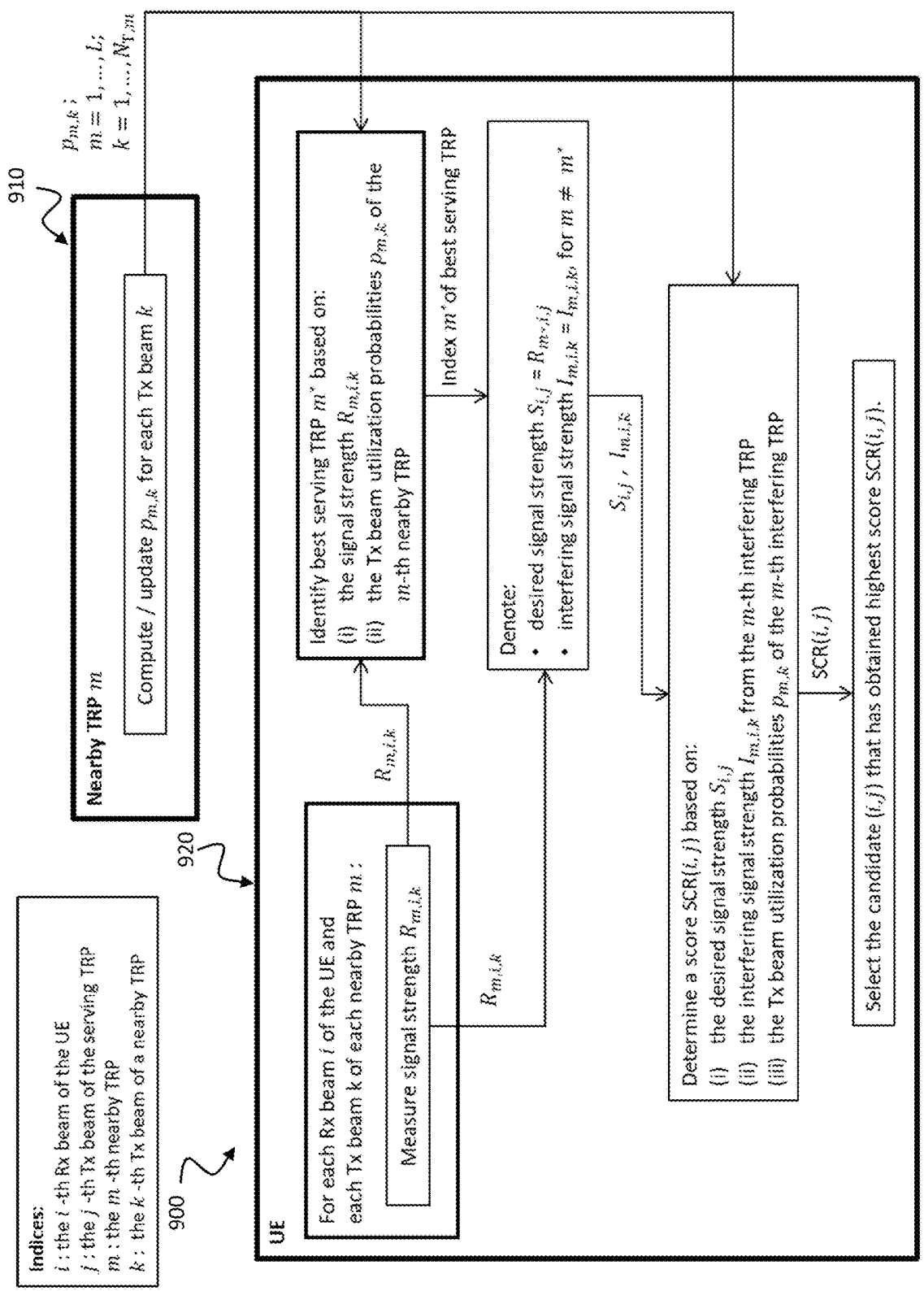
FIG. 9 shows a flow chart 900 of a particular embodiment where UE has not identified the serving TRP.

FIG. 9 shows a flow chart 900 of an example of a particular embodiment, where the UE 920 has not yet identified its serving TRP. In this example, the UE 920 first selects a serving TRP and then perform the IABS.

The flow chart 900 includes TRPs m 910 nearby the UE 920. In the nearby TRP m 910, the following operations are performed: Compute or update $p_{m,k}$ for each Tx beam k. The UE 920 performs the following operation: For each Rx beam i of the UE and each Tx beam k of each nearby TRP m: Measure signal strength $R_{m,i,k}$. Identify best serving TRP m* based on: the signal strength $R_{m,i,k}$; the Tx beam utilization probabilities $p_{m,k}$ of the m-th nearby TRP 910. Index m* denotes the best serving TRP. Denote: desired signal strength $S_{i,j}=R_{m^*,i,j}$; and interfering signal strength $I_{m,i,k}=I_{m,i,k}$, for m≠m*. Determine a score SCR(i, j) based on: the desired signal strength $S_{i,j}$; the interfering signal strength $I_{m,i,k}$ from the m-th interfering TRP; the Tx beam utilization probabilities $p_{m,k}$ of the m-th interfering TRP. Select the candidate (i,j) that has obtained the highest score SCR(i, j).

Figure 10:
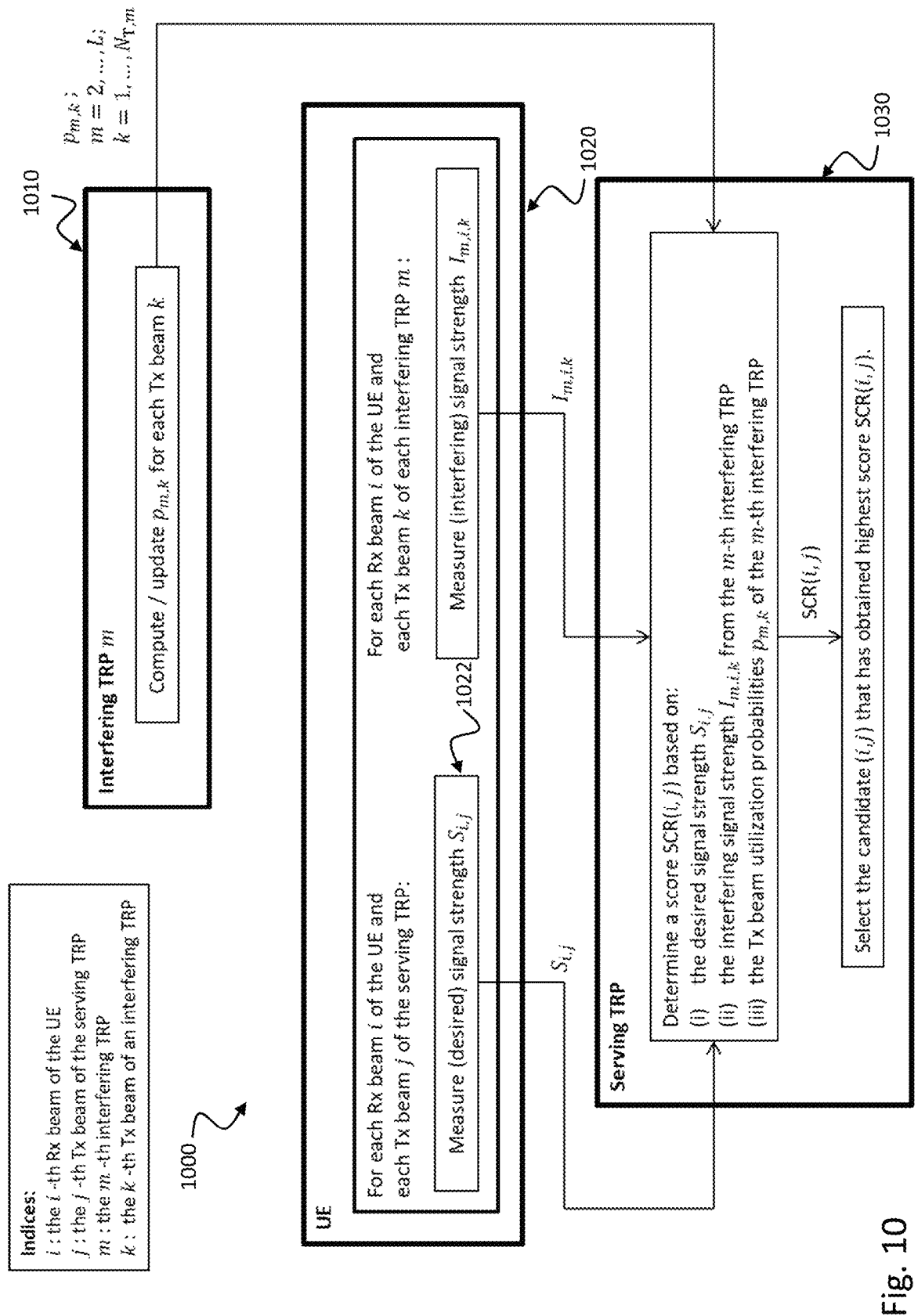
FIG. 10 shows a flow chart 1000 of a particular embodiment where the IABS is performed at the serving TRP.

FIG. 10 shows a flow chart 1000 of an example of a particular embodiment where the IABS is performed at the serving TRP 1030 with feedback from the UE 1020.

The flow chart 1000 includes an interfering TRP m 1010, a UE 1020 and a serving TRP 1030 communicating with each other. In the interfering TRP m 1010, the following operations are performed: Compute or update $p_{m,k}$ for each Tx beam k. In the UE 1020, the following operations are performed: For each Rx beam i of the UE and each Tx beam j of the serving TRP: Measure (desired) signal strength $S_{i,j}$. For each Rx beam i of the UE and each Tx beam k of each interfering TRP m: Measure (interfering) signal strength $I_{m,i,k}$. In the serving TRP 1030, the following operations are performed: Determine a score SCR(i, j) based on: the desired signal strength $S_{i,j}$; the interfering signal strength $I_{m,i,k}$ from the m-th interfering TRP; the Tx beam utilization probabilities $p_{m,k}$ of the m-th interfering TRP. Select the candidate (i,j) that has obtained highest score SCR(i, j).

To describe examples of the previous embodiments, a general setup (see FIG. 3) is considered with a cell served by TRP 1 (serving transmit device), i.e. cell 1, and UE n (receive device) in cell 1 as reference, Only the signaling inside cell 1 is considered for simplicity, in particular for UE n. In addition, only the beam sweeping at the UE n 310 is considered. In the example, the strongest interfering TRPs (as examples of interfering transmit devices) for UE 1 are TRP 2 and TRP 3, i.e. $M_n=\{2,3\}$. After the UE has found the best beam pair(s) by interference-aware beam selection (TABS) according to the present disclosure, the UE can feed the best beam pair(s) back to TRP 1. TRP 1 can then perform the transmission to the UE using those best beam pair(s). Recall that the set of all the strongest interfering TRPs for cell 1 is denoted M. It is also assumed that the serving TRP can signal the interfering TRPs from which it requires the statistics of the Tx beam usage. Different examples of embodiments can be defined (as shown in Table 2 below), based on: whether the interference-aware beam selection (TABS) is performed at the serving transmit device, i.e. serving TRP (also referred to simply as TRP), or at the receive device, i.e. UE; whether the interfering TRPs send to TRP 1 the statistics of the Tx beams usage $f_m(p)$ (referred to also as probability distribution); whether the UE can track the employed Tx beams in the interfering cells and estimate the statistics of the Tx beams usage.

TABLE 2

Table summarizing several embodiments

| Obtaining statistics $f_m(p)$ | General combinations | IABS performed at the UE UE n requires the statistics of the Tx beams usage $f_m(p)$ of the strongest interfering BSs ($m \in M_n$) | IABS performed at the TRP TRP requires statistics $f_m(p)$ and table $T_n$, i.e. the signal and interference strength on all beam pairs at UE n |
|---|---|---|---|
| Question 1: Exchange of statistics $f_m(p)$ among TRPs? Question 2: UE(s) can track the Tx beams employed in the interfering cells and estimate $f_m(p)$? | Q1: Yes Q2: No | Embodiment 1a (FIG. 11): IABS @ UE, TRP sends to all its UE(s) the statistics $f_m(p)$ from all the interfering TRPs, i.e. for $m \in M$. Embodiment 1b (FIG. 12): IABS @ UE, TRP sends to n-th UE the statistics $f_m(p)$ from its strongest interfering TRPs, i.e. for $m \in M_n$, where $M_n$ is fed back from the n-th UE to the TRP. Embodiment 1c (FIG. 13): Same as 1b, but without UE feedback of $M_n$. BS gets $M_n$ based on the n-th UE's location, which can be inferred e.g., via previous preferred Tx beams of the n-th UE. | Embodiment 4 (FIG. 16): IABS @ TRP, where the TRP obtains the statistics $f_m(p)$ from the interfering TRPs and the n-th UE feeds back to the TRP the table $T_n$ resulting from the beam sweeping with the serving TRP and the strongest interfering TRPs. |
| | Q1: Yes Q2: Yes UE obtains short term estimates of the statistics, denoted by $\hat{f}_m(p)$, by overhearing the Tx beams used by the interfering TRPs. | Embodiment 2a (FIG. 14), Embodiment 2b, Embodiment 2c: Same as Embodiments 1a, 1b and 1c, with UE(s) updating the statistics $f_m(p)$ obtained from the TRP, based on the short term estimates $\hat{f}_m(p)$ obtained at the UE. | Embodiment 5 (FIG. 17): IABS @ TRP, UE feeds back to the TRP beam sweeping table $T_n$ and the short term estimates $\hat{f}_m(p)$. TRP can update the statistics $f_m(p)$ obtained from the interfering TRPs, with fed back estimates $\hat{f}_m(p)$ from UE(s). |
| | Q1: No Q2: Yes | Embodiment 3 (FIG. 15): IABS @ UE, where UE employs the estimated statistics $\hat{f}_m(p)$ obtained at the UE. | Embodiment 6 (FIG. 18): IABS @ TRP, n-th UE feeds back $T_n$ and estimated statistics $\hat{f}_m(p)$ to TRP. TRP uses the fed back estimates $\hat{f}_m(p)$ of the UE(s). |

In the following, the embodiments of Table 2 are described.

Figure 11:
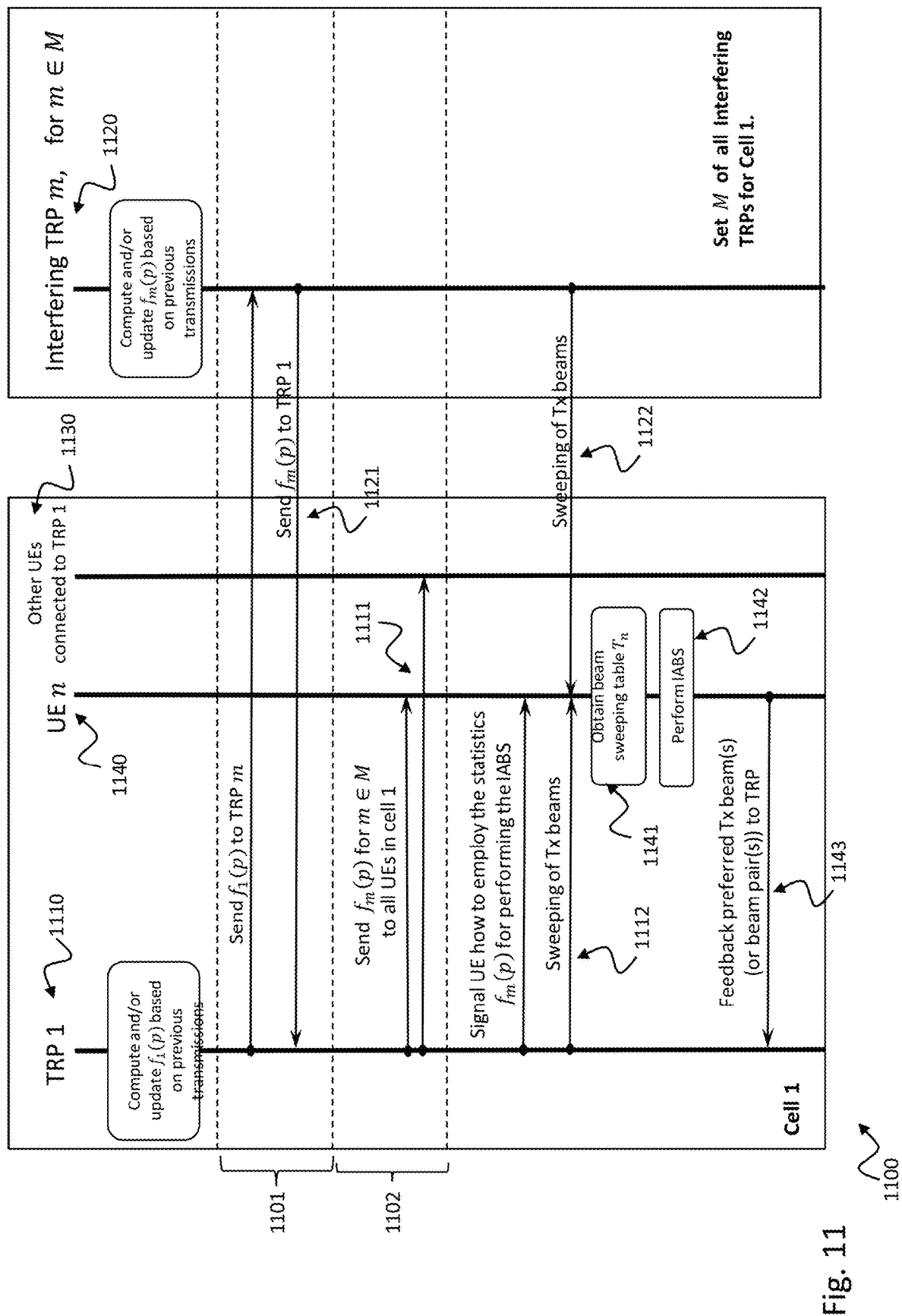

FIG. 11 schematically shows an exemplary message sequence 1100 according to an Embodiment 1a. Upon reception 1121 of the updated statistics $f_m(p)$ from an interfering TRP 1120 m∈M, TRP 1, 1110 signals 1102 the updated statistics $f_m(p)$ for m∈M to all the users 1130, 1140 in its cell. After the beam sweeping 1112, 1122 at the UE n 1140 with the serving TRP 1110, i.e. TRP 1, and the strongest interfering TRPs 1120 as described before, the UE n 1140 obtains 1141 the table $T_n$ with the desired and interfering signal strengths on all beam pairs from the serving TRP 1110 and the strongest interfering TRPs, 1120 respectively. With the table $T_n$ and the statistics of the Tx beams usage of its strongest interfering TRPs, i.e. $f_m(p)$ for m∈$M_n$, UE n 1140 can perform IABS 1142, for example with the score given before. Once the best beam pair(s) has been determined, the UE 1140 signals 1143 the preferred Tx beam(s) or beam pair(s) to its serving TRP 1110. The exchange of the statistics between TRPs 1101 does not need to be performed simultaneously by all TRPs, e.g., if TRP m 1120 sends its statistics to TRP 1, 1110, it does not imply that TRP 1 needs to send its statistics to TRP m 1120. An interfering TRP will signal its updated statistics of the Tx beams usage to TRP 1 only if the probabilities of Tx beams usage have changed. Different cost functions can be used for this: for example, a TRP may provide its current statistics of the Tx beams usage as its updated statistics if the sum mean squared error between the last provided statistics and the current statistics $f_m(p)$ is above a certain threshold. In any case, the signalling can be performed on a long term basis and less often than the beam pair(s) selection (scheduling period). Compared to a coordinated technique for determining the best beam pair(s), the given embodiment can result in less overhead, since at each scheduling period the beam sweeping table $T_n$ does not need to be fed back from UE n to the TRP 1, and no information needs to be exchanged between the TRPs for each beam pair(s) selection (scheduling period).

Figure 12:
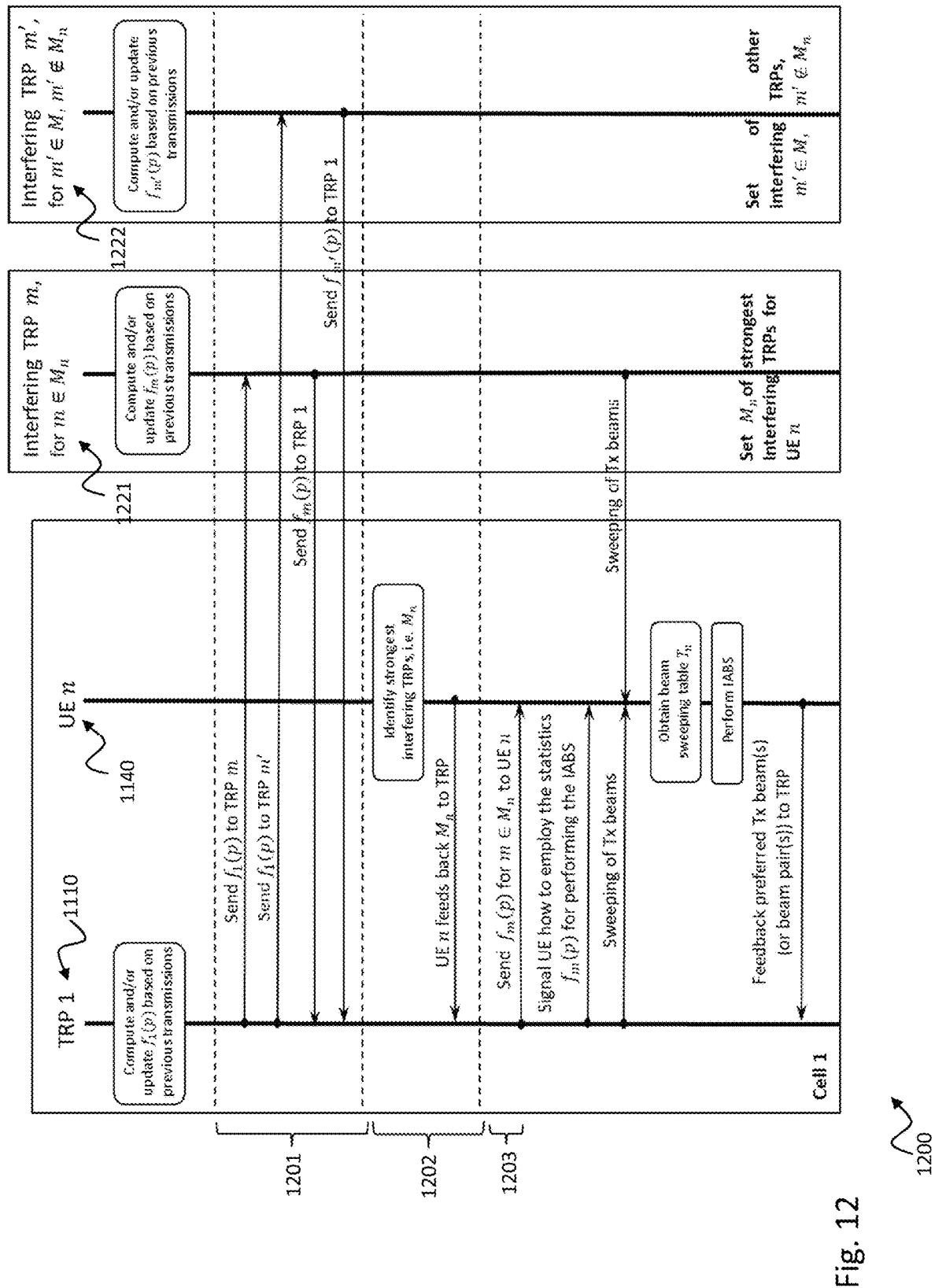
FIG. 12 schematically shows an exemplary message sequence 1200 according to an Embodiment 1b.

FIG. 12 schematically shows an exemplary message sequence 1200 according to an Embodiment 1b which is a variant of Embodiment 1a. With Embodiment 1b the signaling overhead can be reduced further In the example, the serving TRP, i.e TRP 1, 1110 selectively signals the updated statistics $f_m(p)$ only to those users for which TRP m is one of the strongest interfering TRPs, i.e. for m∈$M_n$ for UE n. The probability distributions 1201 are exchanged between TRPs only when the statistics have changed; they are not necessarily exchanged simultaneously among all TRPs. TRP 1 is informed about the set of strongest interfering TRPs of UE n, i.e. about $M_n$, based on feedback from the UE n, after the UE has identified its strongest interfering TRPs, e.g., after beam sweeping with the interfering TRPs. Feedback 1202 of $M_n$ is performed only when the set of strongest interfering TRPs for UE n has changed, e.g., when UE n has changed its location. After the feedback, the serving TRP knows which updated $f_m(p)$ to send 1203 to UE n, after receiving updated $f_m(p)$'s from interfering TRPs 1221 of UE n.

Figure 13:
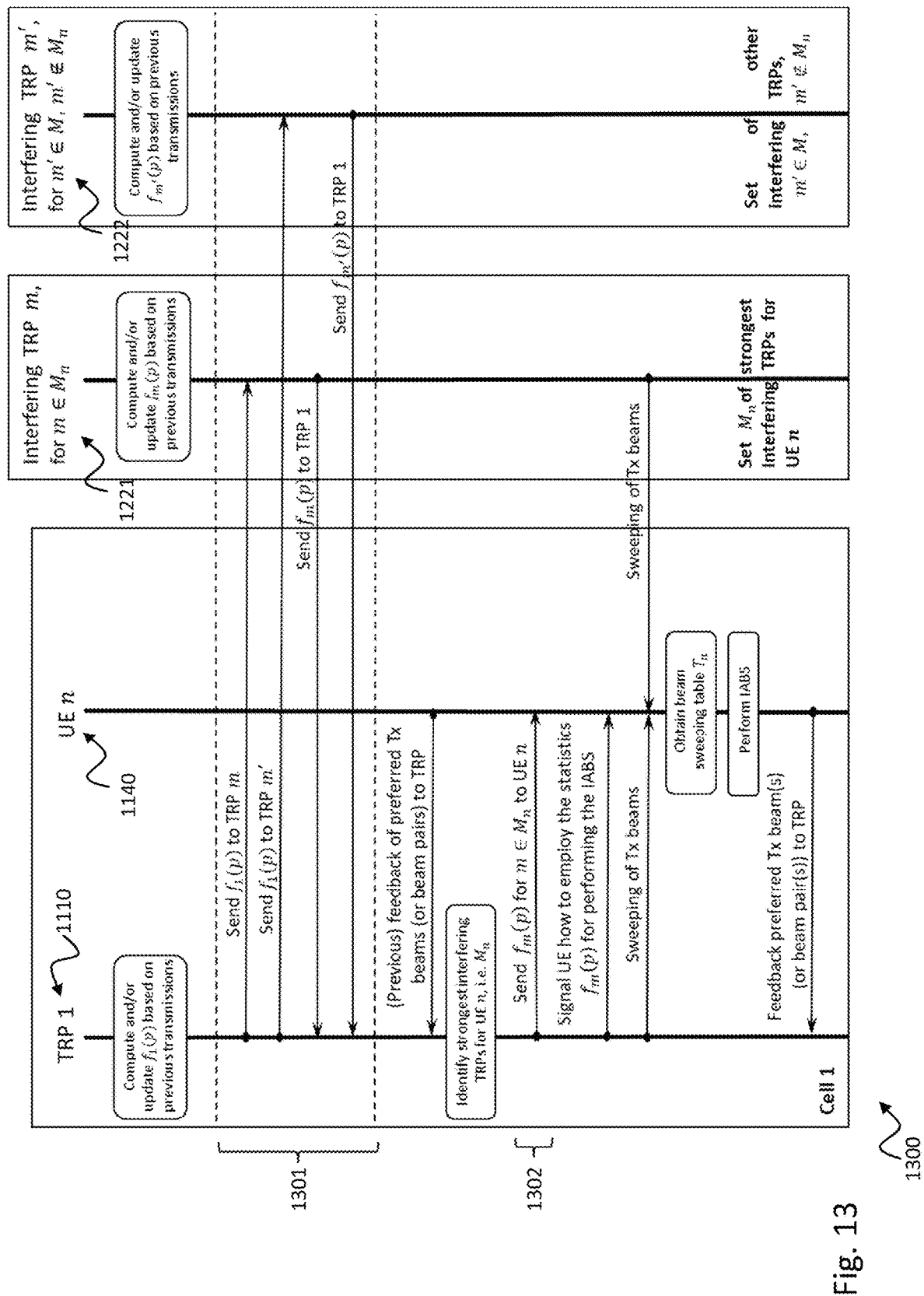
FIG. 13 schematically shows an exemplary message sequence 1300 according to an Embodiment 1 c.

FIG. 13 schematically shows an exemplary message sequence 1300 according to an Embodiment 1 c. Another alternative to further reduce the signaling overhead compared to Embodiment 1b, is given by Embodiment 1c, which is depicted in FIG. 13. In this case, the UE n 1140 does not signal back to its serving TRP, i.e. TRP 1, 1110 the set of strongest interfering TRPs $M_n$. In this case, TRP 1, 1110 identifies the strongest interfering TRPs for UE n 1140, based on UE n's location which can be inferred, e.g., based on previously preferred Tx beams from the UE. The rest of the procedure is similar to Embodiment 1b. Probability distributions 1301 are exchanged between TRPs only when the statistics have changed; they are not necessarily exchanged simultaneously between all TRPs. After knowing $M_n$, TRP knows which updated $f_m(p)$ to send 1302 to UE n, after receiving updated $f_m(p)$'s from interfering an TRP of UE n.

Figure 14:
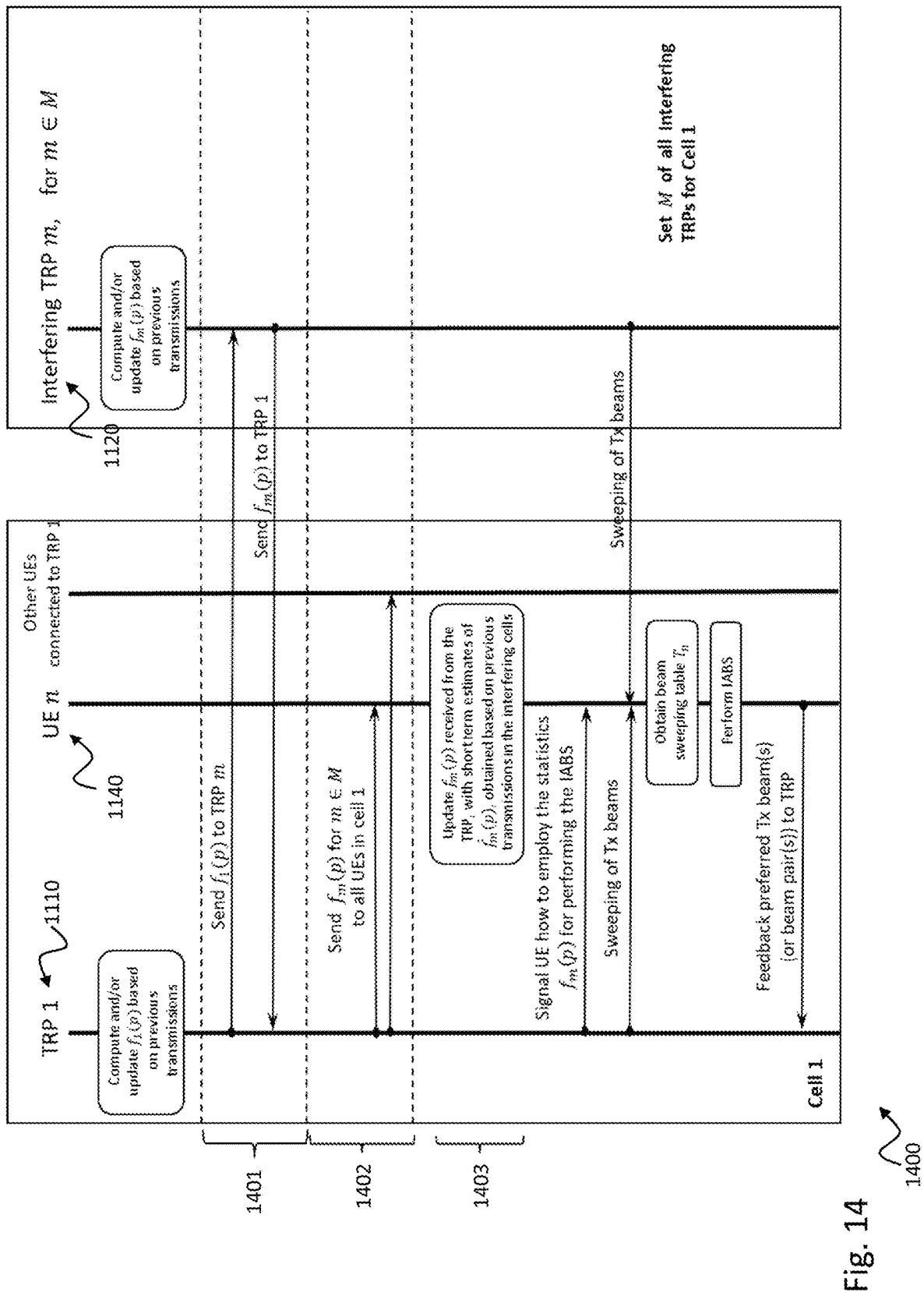

FIG. 14 schematically shows an exemplary message sequence 1400 according to an Embodiment 2a. In the example, the UE(s) tracks the Tx beams of the interfering TRPs 1120, e.g., by overhearing the Tx beams used by the interfering BSs via dedicated training, and obtains a short term estimate of the statistics of the Tx beam usage, which can be denoted by $\hat{f}_m(p)$. The UE n 1140 can then update the statistics $f_m(p)$ signaled by the TRP based on the short term estimate of the statistics $\hat{f}_m(p)$ for m∈$M_n$, and perform the IABS accordingly. This option enables the UE to have more up to date statistics of the Tx beams usage of the interfering TRPs. By including this option in Embodiment 1a, the procedure of Embodiment 2a is obtained which is depicted in FIG. 14. Probability distributions 1401 are exchanged between TRPs only when the statistics have changed; they are not necessarily exchanged simultaneously between all TRPs. TRP sends updated $f_m(p)$ to all users 1402 only after receiving updated $f_m(p)$ from TRP m. In the figure, the additional step 1403 is highlighted which is required in Embodiment 1b and Embodiment 1c to obtain Embodiment 2b and Embodiment 2c, respectively.

Figure 15:
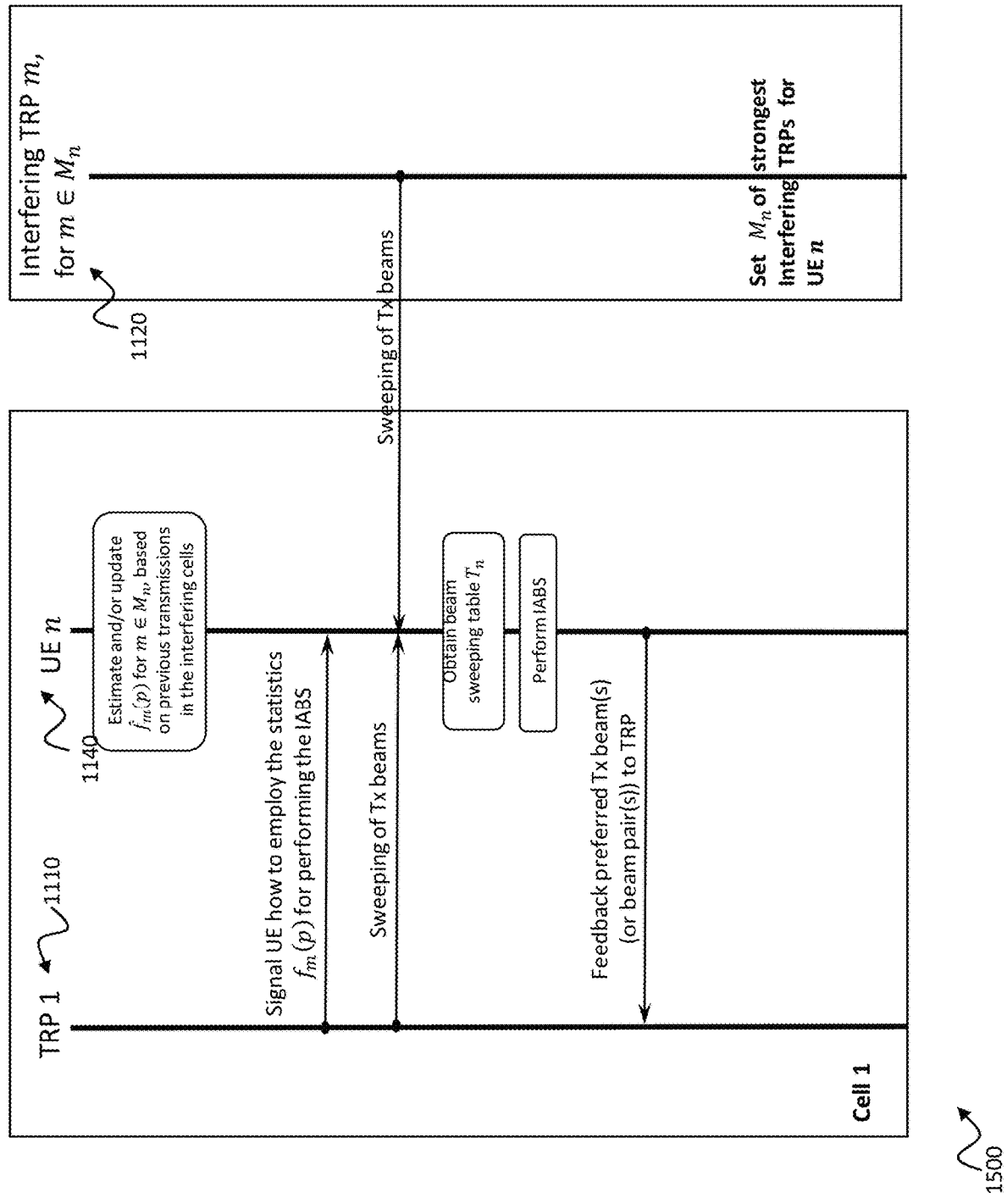
FIG. 15 schematically shows an exemplary message sequence 1500 according to an Embodiment 3.

FIG. 15 schematically shows an exemplary message sequence 1500 according to an Embodiment 3. The possibility for the UE(s) to estimate on its own the statistics of the Tx beams usage of the interfering TRPs, allows to consider a further embodiment where there is no exchange of the statistics $f_m(p)$ between TRPs as well as no signalling of the updated statistics from the TRP to the UE. In this case, the UE 1140 can perform the IABS based on the short-term estimates of the statistics $\hat{f}_m(p)$, which results in Embodiment 3 depicted in FIG. 15. This embodiment offers a reduced signaling overhead, as the statistics of the Tx beam usage are not exchanged between TRPs and are not signaled from the serving TRP 1110 to the UE 1140.

Figure 16:
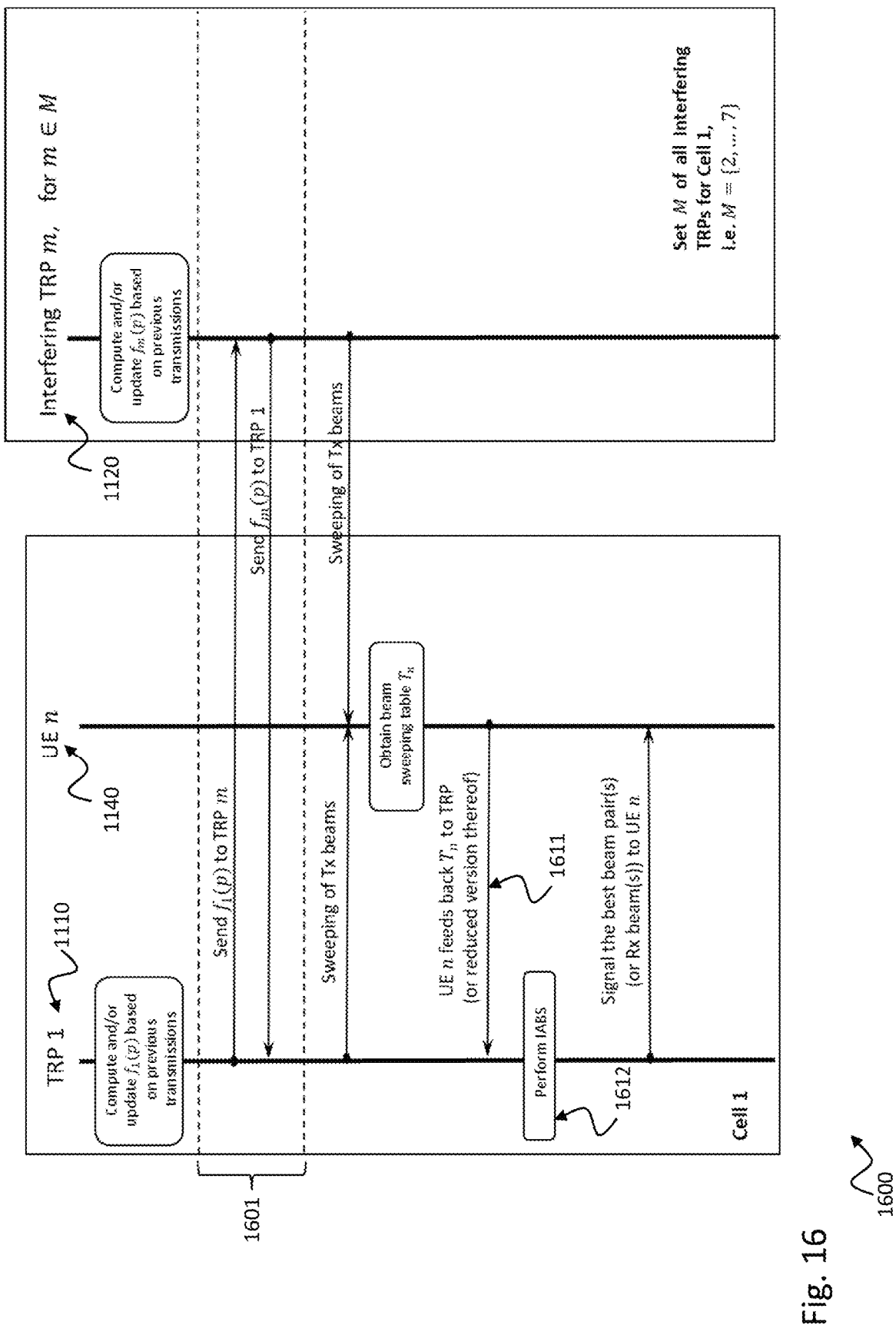
FIG. 16 schematically shows an exemplary message sequence 1600 according to an Embodiment 4.

FIG. 16 schematically shows an exemplary message sequence 1600 according to an Embodiment 4. The previous embodiments, where the IABS is performed at the UE, can be extended to enable the IABS to be performed at the serving TRP 1110. For this, UE n 1140 needs to feed back 1611 to the TRP 1110 the table $T_n$ with the desired and interfering signal strengths on all beam pairs from the serving TRP, i.e. TRP 1, 1110 and the strongest interfering TRPs, respectively. By extending Embodiment 1a/1b/1c to this case, Embodiment 4 is obtained which is depicted in FIG. 16, where it can be observed that in contrast to performing the IABS at the UE, TRP 1, 1110 does not need to signal the statistics $f_m(p)$ to the UE n 1140. Furthermore, TRP 1, 1110 needs to signal the best beam pair(s) or Rx beam(s) to the UE n. To reduce the overhead in the feedback 1611 of the table $T_n$ with the signal and interference measurements on all beam pairs, the UE n can feed back a compressed or reduced version of the table, e.g., only those entries above a certain threshold. By performing the IABS 1612 at the TRP, the advantage can be achieved that the TRP can consider the transmission to multiple users for the beam pair selection, after feedback of the beam sweeping table from multiple users. Probability distributions 1601 are exchanged between TRPs only when the statistics have changed; they are not necessarily exchanged simultaneously between all TRPs.

Figure 17:
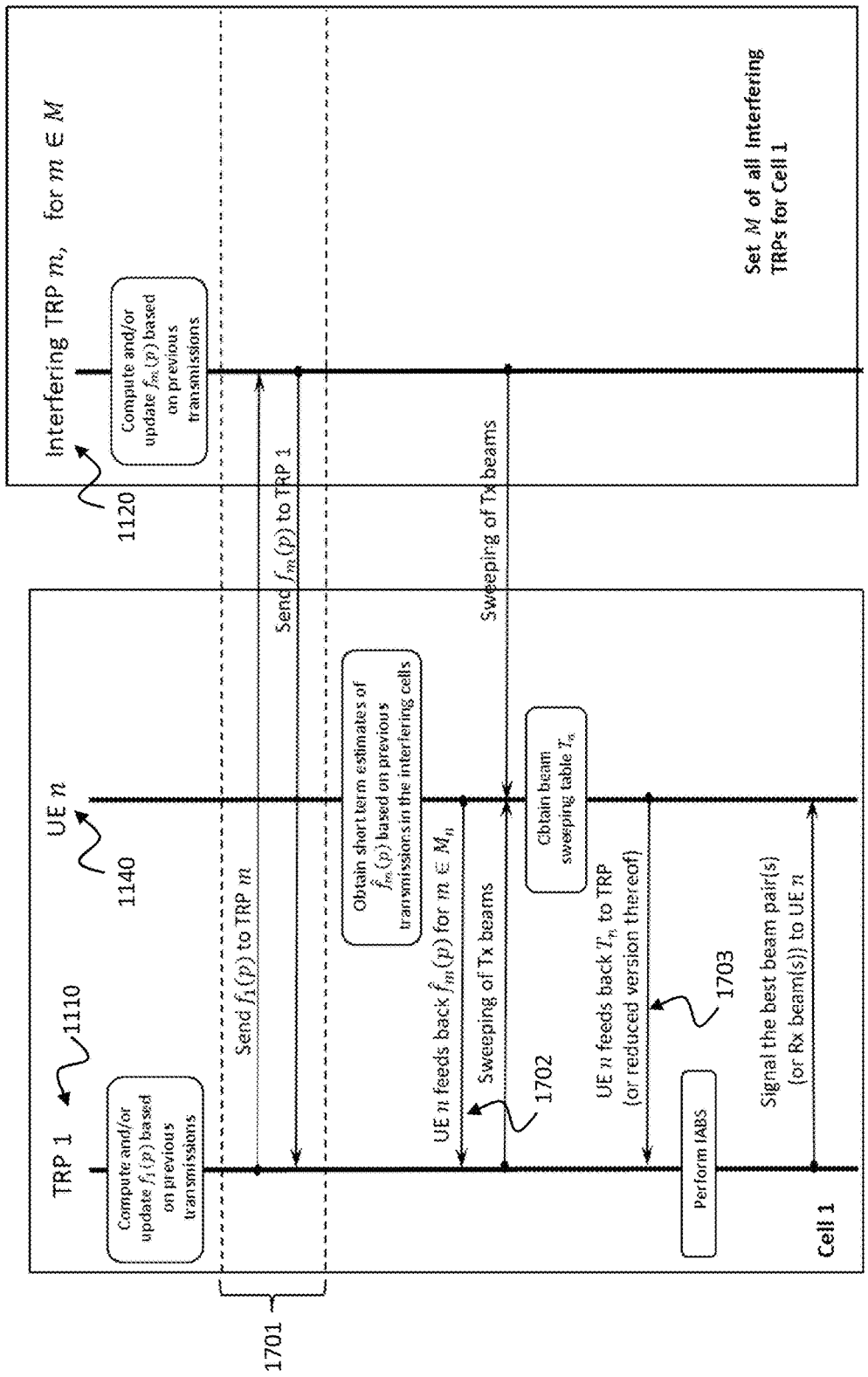
FIG. 17 schematically shows an exemplary message sequence 1700 according to an Embodiment 5.

FIG. 17 schematically shows an exemplary message sequence 1700 according to an Embodiment 5. For the case the UE can track the Tx beams used by the interfering TRPs 1120 and obtain a short term estimate $\hat{f}_m(p)$ of the statistics of the Tx beams usage of the strongest interfering TRPs, a further embodiment is considered where the UE n 1140 not only feeds back to TRP 1 the table $T_n$ 1703 but also the short term estimate $\hat{f}_m(p)$ of the statistics 1702. The procedure for this case is given by Embodiment 5, which is depicted in FIG. 17. This embodiment allows TRP 1, 1110 to update the statistics $f_m(p)$ obtained from interfering TRPs 1120 by employing the short term estimates of the statistics fed back by the users in its cell. Probability distributions 1701 are exchanged between TRPs only when the statistics have changed; they are not necessarily exchanged simultaneously between all TRPs.

Figure 18:
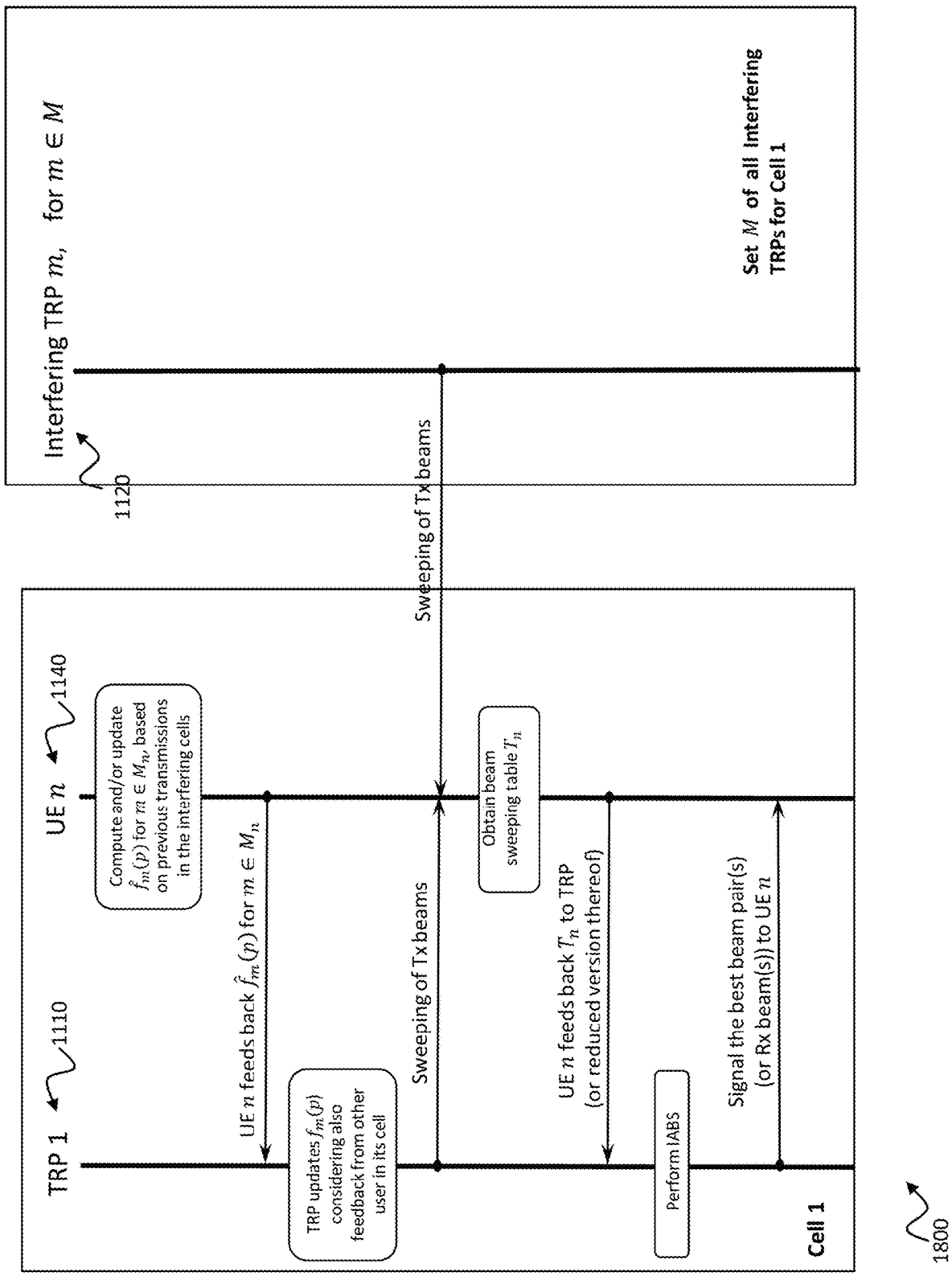
FIG. 18 schematically shows an exemplary message sequence 1800 according to an Embodiment 6.

FIG. 18 schematically shows an exemplary message sequence 1800 according to an Embodiment 6. If there is no exchange of the statistics $f_m(p)$ between interfering TRPs but the UEs can obtain a short term estimate $\hat{f}_m(p)$ of the statistics, the serving TRP 1110 can still perform IABS based solely on short term estimates of the statistics fed back by the UEs. This case is given by Embodiment 6, which is depicted in FIG. 18, and similar to Embodiment 3 allows to consider the situation when there is no exchange of statistics between interfering TRPs.

In the previous discussion, the downlink (DL) transmission in a given cell was interfered by the downlink transmission of neighboring TRPs, i.e. the downlink transmission of interfering TRPs results in interference at a UE in the given cell. This can happen when the downlink transmissions of interfering TRPs take place at the same time, e.g., in either a TDD or FDD system. However, dynamic TDD is also being considered for future communication networks, e.g., to flexibly accommodate the different loads between uplink and downlink in neighboring cells. If a UE in a given cell is performing an uplink (UL) transmission while a neighboring TRP is performing a downlink transmission, the neighboring (interfering) TRP may produce interference at the serving TRP (the "victim" TRP) for the UE's uplink transmission. In this example, i.e. uplink in a dynamic TDD scenario, the UE is the transmit device and the victim TRP is the receive device. Hence, the disclosed method can be performed at the serving TRP for the UE's uplink reception, based on the statistics $f_m(p)$ of the Tx beams usage from the interfering TRPs (which are transmitting in the downlink).

Figure 19:
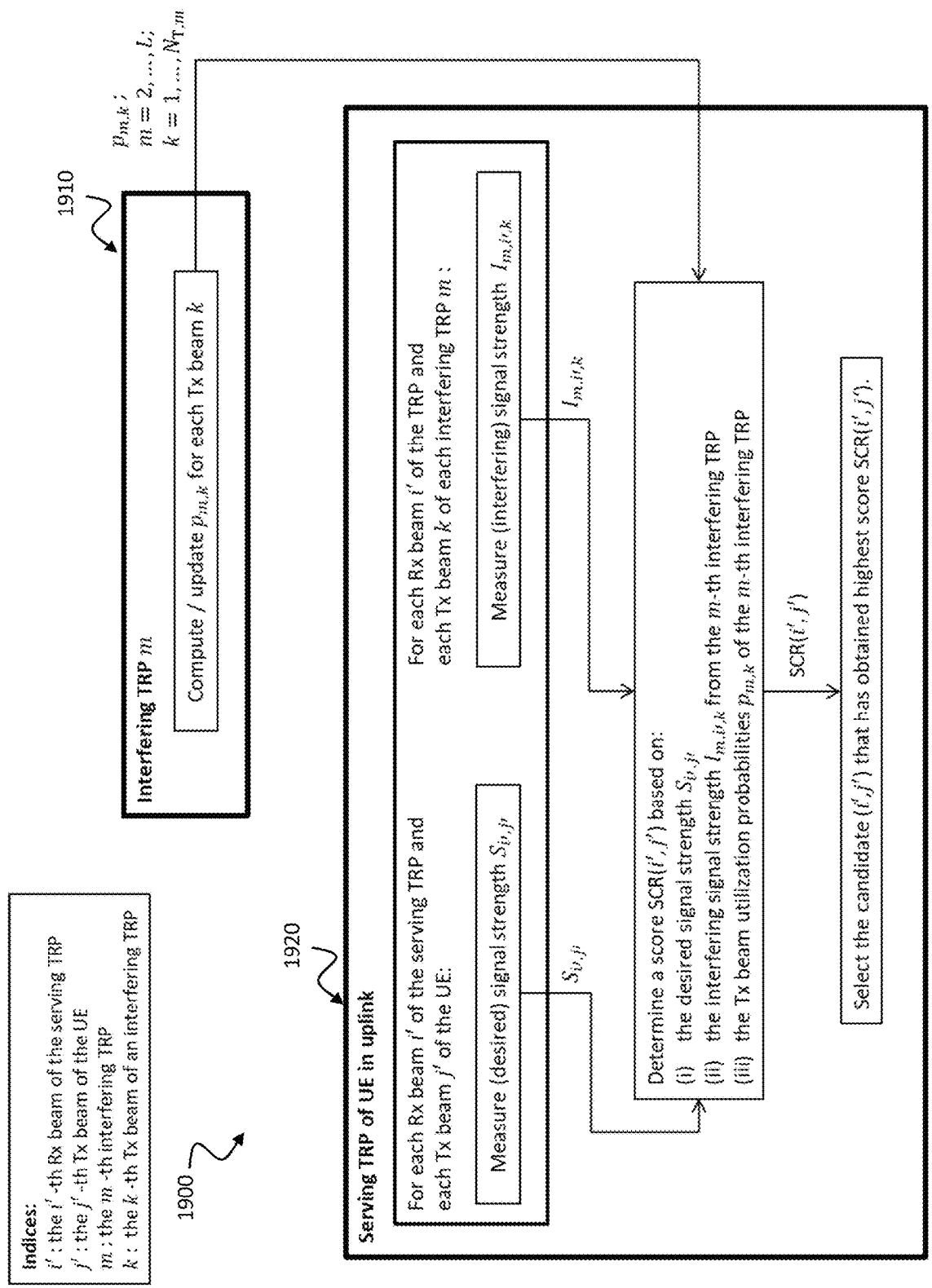
FIG. 19 shows an exemplary flow chart 1900 of a particular embodiment for the case of dynamic TDD.

FIG. 19 shows a flow chart 1900 of a particular embodiment for the case of dynamic TDD, where it is assumed that L−1 interfering TRPs interfere with the serving TRP. The flow chart 1900 includes an interfering TRP m 1910 communicating with a serving TRP of UE in uplink 1920. In the interfering TRP m 1910, the following operations are performed: Compute or update $p_{m,k}$ for each Tx beam k. In the serving TRP of UE in uplink 1920 the following operations are performed: For each Rx beam i' of the serving TRP and each Tx beam j' of the UE: Measure (desired) signal strength $S_{i',j'}$. For each Rx beam i' of the TRP and each Tx beam k of each interfering TRP m: Measure (interfering) signal strength Determine a score SCR(i',j') based on: the desired signal strength $S_{i',j'}$; the interfering signal strength $I_{m,i',k}$ from the m-th interfering TRP; the Tx beam utilization probabilities $p_{m,k}$ of the m-th interfering TRP. Select the candidate (i',j') that has obtained highest score SCR(i',j').

Figure 20:
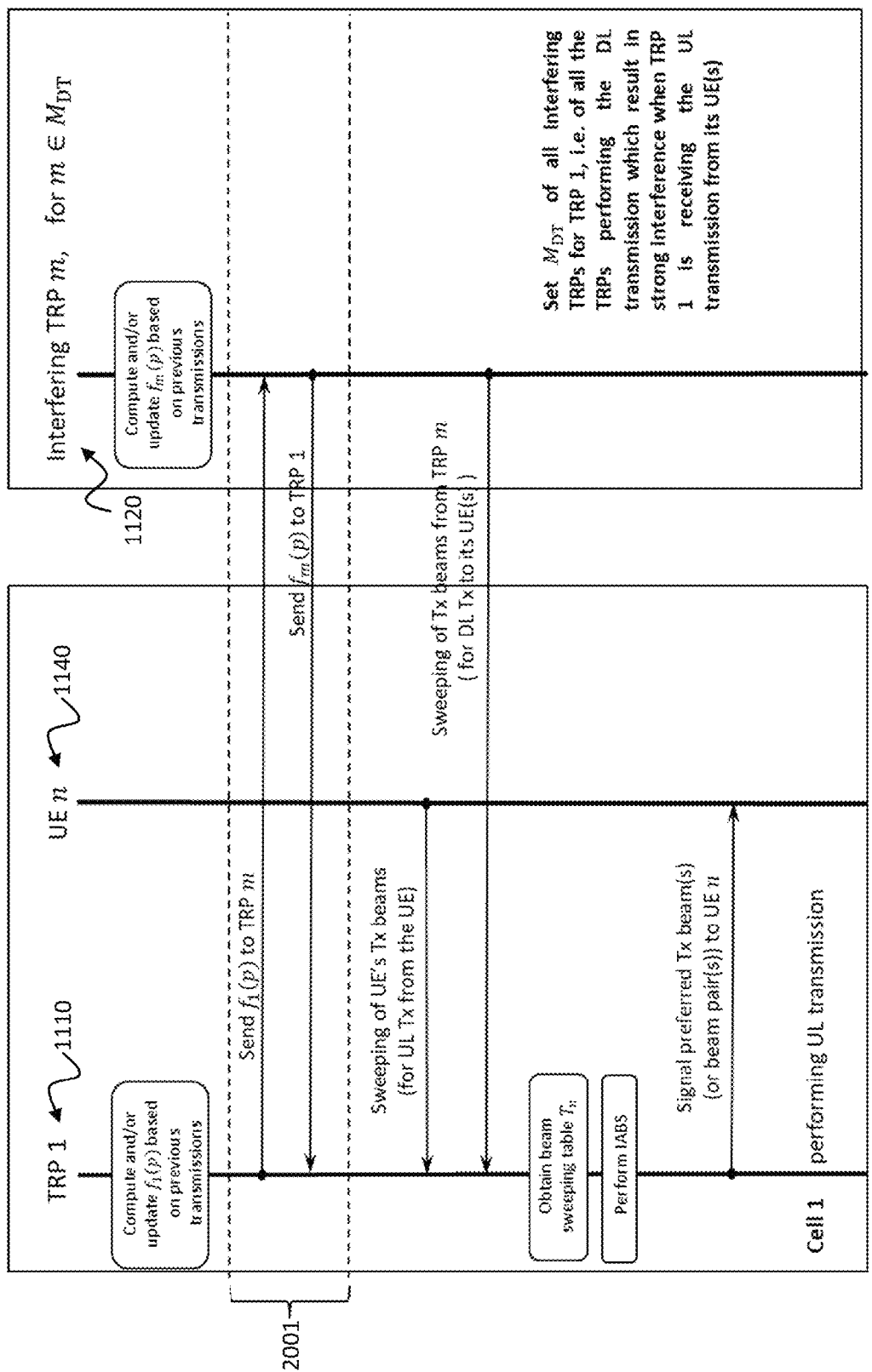
FIG. 20 schematically shows an exemplary message sequence 2000 according to an Embodiment 7.

FIG. 20 schematically shows an exemplary message sequence 2000 according to an Embodiment 7.

The probability distributions 2001 between TRPs are exchanged only when the statistics have changed; they are not necessarily exchanged simultaneously between all TRPs. Here it is assumed that TRP m uses the distribution $f_1(p)$ from TRP 1, e.g., in a scenario in which TRP 1 is a strong interferer for the uplink or downlink transmission in cell m. However, this does not need to be so in general.

Similar to Table 2, one can distinguish the following embodiments for dynamic TDD, based on how the statistics $f_m(p)$ of the Tx beams usage from the interfering TRPs become available at the victim TRP. In one embodiment, the victim TRP obtains the statistics $f_m(p)$ from the interfering TRPs (FIG. 20). In another embodiment, the victim TRP estimates the statistics $f_m(p)$ based on the transmissions of the interfering TRPs, which is discussed below.

Figure 21:
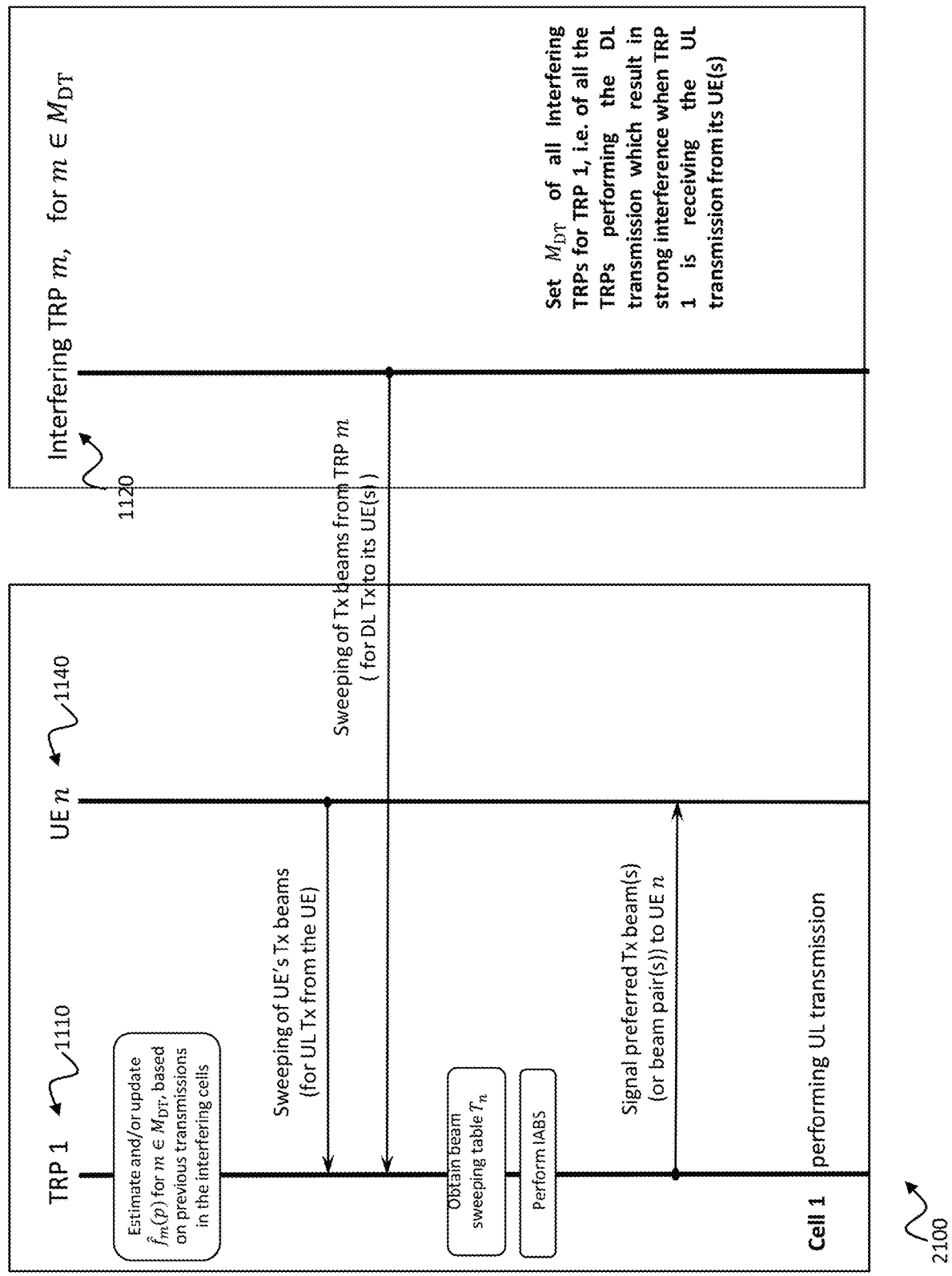
FIG. 21 schematically shows an exemplary message sequence 2100 according to an Embodiment 8.

FIG. 21 schematically shows an exemplary message sequence 2100 according to an Embodiment 8. IABS is performed at the victim TRP, without exchange of the statistics $f_m(p)$ between interfering TRPs. The victim TRP is able to track the Tx beams employed by the interfering TRPs 1120 and estimate the statistics of the Tx beams usage of the interfering TRPs 1120. The procedure for this example of the previous embodiment is depicted in FIG. 21, and enables the case when there is no exchange of statistics between TRPs.

Figure 22:
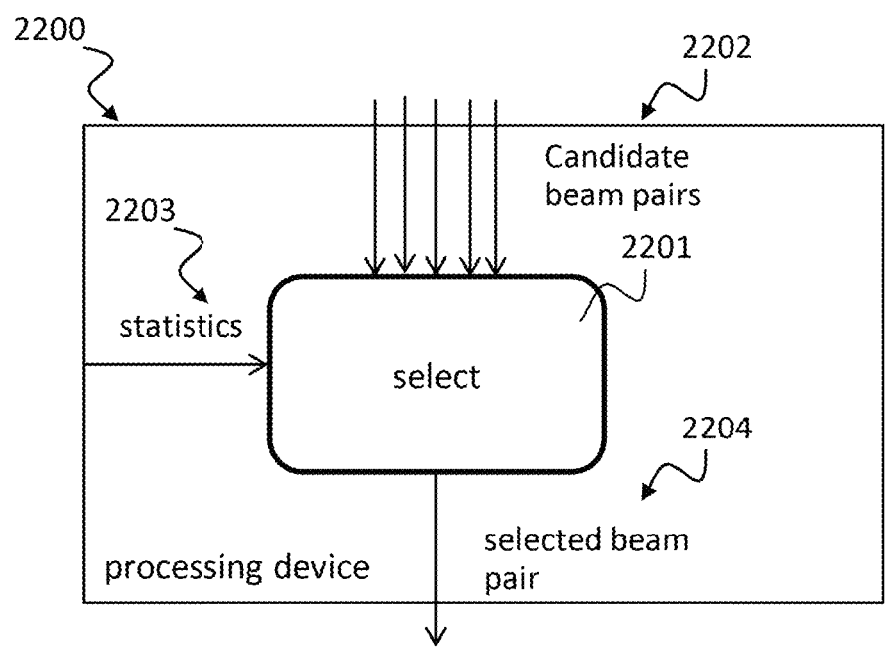
FIG. 22 shows a block diagram of an exemplary processing device 2200.

FIG. 22 schematically shows an example of a processing device 2200 according to the disclosure. The processing device 2200 can be used for interference-aware beam pair selection 2201. The processing device 2200 may be arranged in a transmit-receive point, in particular in a user equipment or in a base station. The processing device 2200 is configured to select 2201 a beam pair 2204 from a set of candidate beam pairs (i, j) 2202, for setting up a communication link from a serving transmit device to a receive device via the selected beam pair 2204, e.g., as described above with respect to FIGS. 3 to 21, in particular according to the embodiments as described above. Each of the candidate beam pairs 2202 comprises a transmit beam j of the serving transmit device and a receive beam i of the receive device. The selection 2201 is based on statistics 2203 of a usage of one or more interfering transmit beams (m, k) of one or more interfering transmit devices m.

The statistics 2203 may comprise one or more beam usage probability values $p_{mk}$ associated one-to-one with the one or more interfering transmit beams (m, k), e.g., as described above with respect to FIGS. 3 to 21. Each of the beam usage probability values $p_{mk}$ represents a probability of a usage of the respective interfering transmit beam (m, k).

The processing device 2200 may select 2201 the beam pair 2204 from the set of candidate beam pairs 2202 by: determining for each of the candidate beam pairs (i, j) 2202 a score SCR(i, j) based on the statistics 2203 of the usage of the one or more interfering transmit beams (m, k), e.g., a score as described above with respect to FIG. 4; and selecting 2201, from the set of candidate beam pairs 2202, a beam pair 2204 that has obtained a highest score.

The processing device 2200 may determine for each of the candidate beam pairs (i, j) 2202 the respective score SCR(i, j) based further on the following: a signal strength descriptor of the respective candidate beam pair (i, j) 2202; and one or more signal strength descriptors associated one-to-one with one or more interfering beam pairs (i, m, k), each of the one or more interfering beam pairs comprising the receive beam i of the respective candidate beam pair 2202 and one of the interfering transmit beams (m, k), e.g., as described above with respect to FIG. 4.

The score is defined as described above with respect to FIG. 4, i.e. as:

$$SCR(i, j) = \frac{S_{i,j}(n)}{\sum_{m \in M_n} \sum_{k=1}^{N_{T,m}} p_{m,k} I_{m,i,k}(n) + \sigma_n^2},$$

where $s_{i,j}(n)$ denotes a signal strength of the beam pair formed of the j-th transmit beam from a serving transmit device and the i-th receive beam combination for an n-th receive device, e.g., UE, $N_{T,m}$ denotes the number of transmit beams at the m-th interfering transmit device, $\sigma_n^2$ denotes a noise variance and $M_n$ denotes a set of interfering transmit devices for the n-th receive device, e.g., UE.

The processing device 2200 may be configured to distinguish between the interfering transmit beams of the interfering transmit device and the transmit beams of the serving transmit device based on transmit device-specific pilot signals, e.g., synchronization signals.

The processing device 2200 may be included in a transmit-receive point, e.g., a transmit-receive point 110, 120, 211, 221, 212, or 222 as described above with respect to FIGS. 1 and 2, in particular a base station or a user equipment.

The transmit-receive point 110, 120, 211, 221, 212, or 222 may signal the transmit beam j of the selected beam pair (2204) to the serving transmit device.

A transmit-receive point, in particular a base station, 110, 211 as described above with respect to FIGS. 1 and 2, may be configured to receive statistics 2203 of a usage of one or more interfering transmit beams (m, k) 223 of one or more interfering transmit devices m 221, e.g., as described above with respect to FIG. 2 and in the embodiments described above with respect to FIG. 10, see Table 2.

The transmit-receive point 110, 211 may forward the statistics 2203 to a user equipment 120, 212 as described above with respect to FIGS. 1 and 2 in order to enable the user equipment 120, 212 to select 2201 a beam pair 2204 based on the statistics 2203. The transmit-receive point 110, 211 may be configured to communicate with the user equipment 120, 212 via the selected beam pair 2204.

The transmit-receive point 110, 211 may communicate with the user equipment 120, 212 via one or more transmit beams of the transmit-receive point 110, 211. The transmit-receive point 110, 211 may forward the statistics 2205 to the user equipment 120, 212 via the one or more transmit beams. The transmit-receive point 110, 211 may receive a transmit beam identifier from the user equipment 120, 212. The transmit beam identifier indicates a selected transmit beam of the transmit-receive point 110, 211. The transmit-receive point 110, 211 may continue communicating with the user equipment 120, 212 via the selected transmit beam.

A transmit-receive point, in particular a BS, 110, 211, 221 as described above with respect to FIGS. 1 and 2, may be configured to generate one or more transmit beams k and to provide statistics 2203 of a usage of the one or more transmit beams k, e.g., as described above with respect to FIGS. 3 to 21. The transmit-receive point 110, 211, 221 may derive the statistics 2203 from current or past employment of the one or more transmit beams. The transmit-receive point 110, 211, 221 may transmit the statistics 2203 to another transmit-receive point, in particular to another base station or to another user equipment, e.g., as described above with respect to FIGS. 3 to 21.

Figure 23:
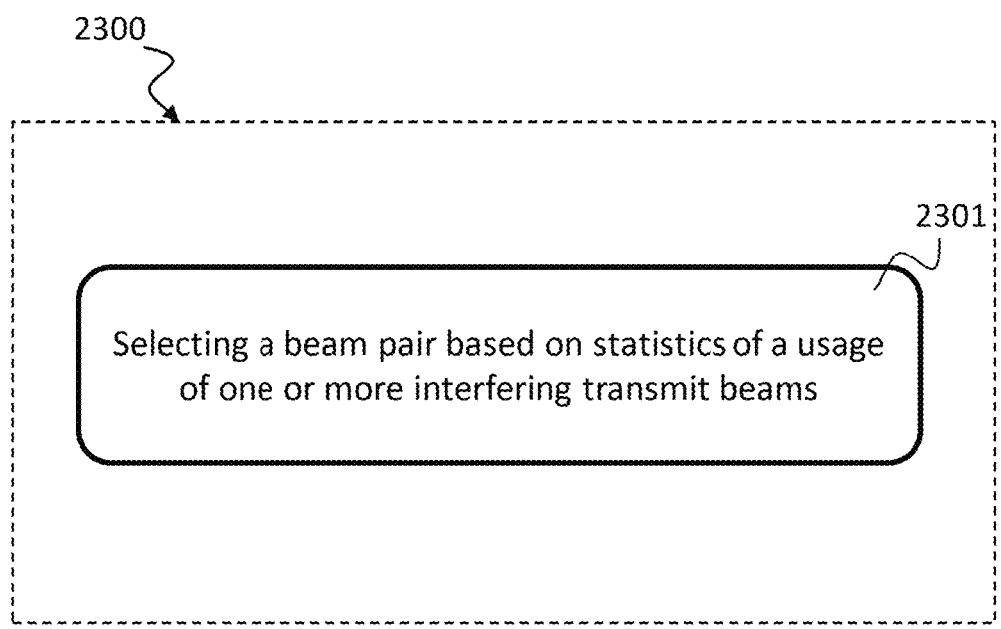
FIG. 23 shows a block diagram of an exemplary method 2300 for interference aware beam selection.

FIG. 23 shows a block diagram of an exemplary method 2300 for interference aware beam selection according to the disclosure. The method 2300 may be implemented in a processing device 2200 as described above with respect to FIG. 22, in particular in a transmit-receive point, e.g., a base station and/or a user equipment, as described above with respect to FIGS. 3 to 21.

The method 2300 includes: Selecting 2301 a beam pair from a set of candidate beam pairs (i, j), for setting up a communication link from a serving transmit device to a receive device via the selected beam pair, wherein each of the candidate beam pairs comprises a transmit beam j of the transmit device and a receive beam i of the receive device, wherein the selection is based on statistics of a usage of one or more interfering transmit beams (m, k) of one or more interfering transmit devices, e.g., as described above with respect to FIGS. 3 to 21.

The invention may also be embodied in a computer program product including computer executable code or computer executable instructions that, when executed, causes a computer to execute the performing and computing steps described herein, in particular the steps of the method described above. The computer program product may include a readable non-transitory storage medium storing program code thereon for use by a computer. The executable code may perform the processing and computing steps described herein, in particular the method described above. For example, the executable code may be configured to cause the computer to control peripheral devices such as transmit or receive circuitry to operate in accordance with the methods described herein.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed:

1. A processing device in a transmit-receive point for interference-aware beam pair selection, the processing device comprising:
    a processor; and
    a memory having processor-executable instructions stored thereon which is to be executed by the processor, wherein the instructions cause the processor to:
    select a beam pair from a set of candidate beam pairs (i, j), for setting up a communication link from a serving transmit device to a receive device via the selected beam pair,
    wherein each of the candidate beam pairs comprises a transmit beam j of the serving transmit device and a receive beam i of the receive device,
    wherein the selection is based on statistics of a usage of one or more interfering transmit beams (m, k) of one or more interfering transmit devices m, wherein k represents one or more transmit beams, and i, j, m and k are positive integers,
    wherein selecting the beam pair from the set of candidate beam pairs comprises:
        determining for each of the candidate beam pairs (i, j) a score SCR(i, j) based on the statistics of the usage of the one or more interfering transmit beams (m, k); and
        selecting, from the set of candidate beam pairs, a beam pair that has obtained a highest score.

2. The processing device of claim 1, wherein the statistics comprise one or more beam usage probability values $p_{mk}$ associated one-to-one with the one or more interfering transmit beams (m, k), each of the beam usage probability values $p_{mk}$ representing a probability of a usage of the respective interfering transmit beam (m, k).

3. The processing device of claim 1, wherein the processor is configured to determine for each of the candidate beam pairs (i, j) the respective score SCR(i, j) based further on the following:
    a signal strength descriptor of the respective candidate beam pair (i, j); and
    one or more signal strength descriptors associated one-to-one with one or more interfering beam pairs (i, m, k), each of the one or more interfering beam pairs comprising the receive beam i of the respective candidate beam pair and one of the interfering transmit beams (m, k).

4. The processing device of claim 1, wherein the score is defined as:

$$SCR(i, j) = \frac{S_{i,j}}{\sum_{m \in M} \sum_{k=1}^{N_{T,m}} p_{m,k} I_{m,i,k} + \sigma_n^2},$$

where $S_{i,j}$ denotes a signal strength of the beam pair formed of the j-th transmit beam from the serving transmit device and the i-th receive beam of the receive device, $N_{T,m}$ denotes the number of transmit beams at the m-th interfering transmit device, $\sigma_n^2$ denotes a noise variance, M denotes a set of interfering transmit devices for the receive device, $p_{m,k}$ denotes a beam usage probability value representing a probability of a usage of interfering transmit beam (m, k), and $I_{m,i,k}$ denotes interfering signal strength.

5. The processing device of claim 1, configured to distinguish between the interfering transmit beams of the interfering transmit devices and the transmit beams of the serving transmit device based on transmit device-specific pilot signals.

6. A transmit-receive point, comprising:
    a processor; and
    a memory having processor-executable instructions stored thereon which is to be executed by the processor, wherein the instructions cause the processor to:
    receive statistics of a usage of one or more interfering transmit beams (m, k) of one or more interfering transmit devices m, wherein k represents one or more transmit beams, and m and k are positive integers,
    wherein the processor is configured to forward the statistics to a user equipment to enable the user equipment to select a beam pair based on the statistics, and further configured to communicate with the user equipment via the selected beam pair.

7. The transmit-receive point of claim 6, wherein the processor is configured to:
    communicate with the user equipment via one or more transmit beams of the transmit-receive point;
    forward the statistics to the user equipment via the one or more transmit beams;
    receive a transmit beam identifier from the user equipment, the transmit beam identifier indicating a selected transmit beam of the transmit-receive point; and
    continue communicating with the user equipment via the selected transmit beam.

8. A method for interference-aware beam selection, applied to a processing device comprising a processor, the method comprising:
    selecting, a beam pair from a set of candidate beam pairs (i, j), for setting up a communication link from a serving transmit device to a receive device via the selected beam pair,
    wherein each of the candidate beam pairs comprises a transmit beam j of the serving transmit device and a receive beam i of the receive device,
    wherein the selection is based on statistics of a usage of one or more interfering transmit beams (m, k) of one or more interfering transmit devices m, wherein k represents one or more transmit beams, and i, j, m and k are positive integers,
    wherein selecting the beam pair from the set of candidate beam pairs comprises:
        determining for each of the candidate beam pairs (i, j) a score SCR(i, j) based on the statistics of the usage of the one or more interfering transmit beams (m, k); and
        selecting, from the set of candidate beam pairs, a beam pair that has obtained a highest score.

9. The transmit-receive point of claim 6, wherein the transmit-receive point is a base station.

10. The method of claim 8, wherein the statistics comprise one or more beam usage probability values $p_{mk}$ associated one-to-one with the one or more interfering transmit beams (m, k), each of the beam usage probability values $p_{mk}$ representing a probability of a usage of the respective interfering transmit beam (m, k).

11. The method of claim 8, wherein the determination for each of the candidate beam pairs (i, j) the respective score SCR(i, j) is based further on the following:
- a signal strength descriptor of the respective candidate beam pair (i, j); and
- one or more signal strength descriptors associated one-to-one with one or more interfering beam pairs (i, m, k), each of the one or more interfering beam pairs comprising the receive beam i of the respective candidate beam pair and one of the interfering transmit beams (m, k).

12. The method of claim 8, wherein the score is defined as:

$$SCR(i, j) = \frac{S_{i,j}}{\sum_{m \in M} \sum_{k=1}^{N_{T,m}} p_{m,k} I_{m,i,k} + \sigma_n^2},$$

where $S_{i,j}$ denotes a signal strength of the beam pair formed of the j-th transmit beam from the serving transmit device and the i-th receive beam of the receive device, $N_{T,m}$ denotes the number of transmit beams at the m-th interfering transmit device, $\sigma_n^2$ denotes a noise variance, M denotes a set of interfering transmit devices for the receive device, $p_{m,k}$ denotes a beam usage probability value representing a probability of a usage of interfering transmit beam (m, k), and $I_{m,i,k}$ denotes interfering signal strength.

13. The method of claim 8, further comprising: distinguishing between the interfering transmit beams of the interfering transmit devices and the transmit beams of the serving transmit device based on transmit device-specific pilot signals.

* * * * *